United States Patent
Inoshita et al.

(10) Patent No.: US 7,274,173 B2
(45) Date of Patent: Sep. 25, 2007

(54) POWER CONTROL CIRCUIT FOR CHARGE STORAGE ELEMENT

(75) Inventors: Ryousuke Inoshita, Nishikamo-gun (JP); Shinichi Nino, Kariya (JP)

(73) Assignee: DENSO CORPORATION, Kariya (JP)

( * ) Notice: Subject to any disclaimer, the term of this patent is extended or adjusted under 35 U.S.C. 154(b) by 156 days.

(21) Appl. No.: 11/251,775

(22) Filed: Oct. 18, 2005

(65) Prior Publication Data

US 2006/0097707 A1    May 11, 2006

(30) Foreign Application Priority Data

Nov. 5, 2004   (JP)   ............... 2004-322346

(51) Int. Cl.
  *G05F 1/10*   (2006.01)
  *G05F 1/40*   (2006.01)
  *H02P 5/28*   (2006.01)
(52) U.S. Cl. .................. 323/222; 323/271
(58) Field of Classification Search ............ 323/222, 323/223, 225, 265, 268, 271, 282, 288, 289; 307/108, 110, 124, 389, 390, 399, 427, 434, 307/436
See application file for complete search history.

(56) References Cited

U.S. PATENT DOCUMENTS

| | | | | |
|---|---|---|---|---|
| 3,968,420 A | * | 7/1976 | Yoshida | .............. 363/124 |
| 4,404,502 A | * | 9/1983 | Magori et al. | .............. 318/116 |
| 5,680,301 A | * | 10/1997 | Oughton et al. | ............ 363/132 |
| 6,570,370 B2 | * | 5/2003 | Tupper et al. | .............. 323/293 |
| 6,630,805 B2 | * | 10/2003 | Makaran | .............. 318/254 |
| 7,091,753 B2 | * | 8/2006 | Inoshita | .............. 327/108 |

FOREIGN PATENT DOCUMENTS

JP    A-2002-112533    4/2002

OTHER PUBLICATIONS

Krishnamachari et al., "Bidirectional buck-boost converter with variable output voltage." 1998 IEEE International Symposium on Circuits and Systems (ISCAS '98), Jun. 1998. (discussed on p. 3 in the specification).

* cited by examiner

*Primary Examiner*—Matthew V. Nguyen
(74) *Attorney, Agent, or Firm*—Posz Law Group, PLC

(57) ABSTRACT

A DC voltage source, a switch, and an inductor are connected together in series. The inductor is also connected together with a switch, a piezoelectric element in series. Moreover, the switches are connected in parallel with capacitors. By the control circuit, a state in which either of the switches is turned on is repeated through a state in which both of the switches are turned off. Furthermore, in a state in which both switches are turned off, after turning the switch off to enter the state concerned, when the voltage across both terminals of the switch that will be turned on is reduced by the resonance of a resonance circuit composed of the capacitors and the inductor, the switch concerned is turned on.

12 Claims, 23 Drawing Sheets

[MODE I]

[MODE II]

[MODE III]

[MODE IV]

POWER CONTROL CIRCUIT FOR CHARGE STORAGE ELEMENT

CROSS REFERENCE TO RELATED APPLICATION

This application is based upon, claims the benefit of priority of, and incorporates by reference the contents of Japanese Patent Application No. 2004-322346 filed on Nov. 5, 2004.

TECHNICAL FIELD

The technical filed relates generally to power control circuits for a charge storage element.

BACKGROUND

A chopper system, for example, may be used for power control of a charge storage element when a piezoelectric element is used as the charge storage element and a DC voltage source is used as a power source. The chopper system is used when it is unnecessary to electrically non-insulate the power source side and the load side from each other.

When it is required to arbitrarily control the voltage of the charge storage element on the basis of a condition to be equipped to the system, it is required to step up/down the voltage in some cases. In this case, a circuit system called as "step up/down chopper" is known.

Circuits illustrative of such types of circuit systems are illustrated in, for example, FIGS. 22, 23 and 24. The circuit construction of FIG. 22 includes a DC voltage source 101, a switch 102, a diode 103, an inductor 104, a capacitor 105, an inductor 106, a switch 107, a diode 108 and a piezoelectric element 109. A step-up chopper circuit is constructed by the elements 106, 107, 108, and a step-down chopper circuit is constructed by the elements 102, 103 and 104. The step-up chopper circuit and the step-down chopper circuit are connected to each other through an intermediate capacitor 105 in series. The circuit construction of FIG. 23 is designed so that the step-up chopper circuit and the step-down chopper circuit of FIG. 22 are connected to each other in series in the opposite style to the circuit construction of FIG. 22. The circuit construction of FIG. 24 is designed so that an inductor 110 functions as both the inductor 104 of the step-down chopper circuit of FIG. 22 and the inductor 106 of the step-up chopper circuit of FIG. 22, and thus one of the inductors 104 and 106 and the intermediate capacitor 105 which are needed in the circuit construction of FIG. 22 can be eliminated.

In all the circuit constructions of FIGS. 22 to 24, the polarity of the output voltage is the same as the DC voltage source 101.

If the diodes 103 and 108 are replaced by switches in FIGS. 22 to 24, powering and regeneration can be performed, that is, bi-directional power control can be performed. Furthermore, when MOSFETs are used as these four switches, it is possible to suppress the conduction loss due to synchronous rectification in addition to powering and regeneration.

FIG. 25 shows a circuit construction which is considered as another type of step up/down chopper. The circuit construction of FIG. 25 comprises a DC voltage source 101, a switch 102, an inductor 110, a diode 111 and a piezoelectric element 109. The DC voltage source 101, the switch 102 and the inductor 110 are connected to one another in series, and the inductor 110, the diode 111 and the piezoelectric element 109 are connected to one another in series. In the circuit constructions of FIGS. 22 to 24, two switches and two diodes are needed. However, in the circuit construction of FIG. 25, each number of the switches 102 and the diodes 111 can be reduced to one. Furthermore, in the circuit of FIG. 25, the output voltage has the opposite polarity to that of the DC voltage source 101, and the applied voltage to each of the switch and the diode is increased, so that there occurs no problem even when a high voltage-resistant element is used in the circuit of FIG. 24.

In some types of systems, it is required to not only charge the piezoelectric element 109 (charge storage element), but also discharge the piezoelectric element 109. In order to satisfy this requirement, the diode 111 is replaced by a switch in FIG. 25 to enable the discharging of the piezo-electric element 109. FIG. 26 shows this circuit construction (for example, non-patent document 1). That is, a switch 120 is provided in FIG. 26. In this circuit construction, not only charging of the piezoelectric element 109 (charge storage element), but also power regeneration of the power source can be performed.

[Non-patent document 1] Bhaskar Krishnamachari and Dariusz Czarkowski, "Bidirectional Buck-boost Converter with Variable Output Voltage", 1998 IEEE International Symposium on Circuits and Systems (ISCAS '98), June 1998.

Miniaturization is required to power converters at all times, and a method of increasing the switching frequency is known as a method of implementing miniaturization of power converters. However, the mere increase of the switching frequency causes a problem that the switching loss is increased and the efficiency of the power converter is reduced.

With respect to the switching loss, a voltage applied to the switch and current flowing in the switch at the switching time are varied, so that a loss (=voltage×current) occurs. Furthermore, at the switching time, the time variation rate of the voltage applied to the switch and the time variation rate of the current flowing in the switch are increased to higher values as compared with the states other than the switching state, so that electromagnetic noise occurs. Such a switching mode is generally referred to as "hard switching".

Therefore, a soft switching technique is known as a method of reducing the switching loss per pulse. The switching loss per pulse can be reduced, and thus the switching frequency can be increased in the power converter equivalently to the loss, so that the power converter can be miniaturized. As the soft switching technique is applied to a field in which the switching frequency is higher and the switching loss is more predominant, the loss reducing effect or the miniaturization effect is more remarkable.

A method of including a capacitor and an inductor in the main circuit construction and actively using a resonance phenomenon is known as a main method of the soft switching technique. FIG. 27 shows an example of this method. In FIG. 27, a series circuit including a capacitor 130, an inductor 131 and an auxiliary switch 132 is connected to the switch 102 in parallel, and a series circuit including a capacitor 133, an inductor 134 and an auxiliary switch 135 is connected to the switch 120 in parallel. For example, in a case where the switch 102 is turned on to make current flow through the inductor 110 and then the switch 102 is turned off, the capacitor 130 is charged in advance, and the switch 132 is turned on so that current flowing in the opposite direction to the current flowing in the switch 102 just before the switch 102 is turned off is made to flow in the closed circuit comprising the switch 102, the capacitor 130, the inductor 131 and the auxiliary switch 132, thereby carrying out soft switching.

However, the circuit construction of FIG. 27 needs additional elements whose number is larger than the number of the constituent parts of FIG. 26 (excluding the DC voltage source 101, the piezoelectric element 109), and it has a disadvantage that the body size thereof is increased and the cost is also increased. Therefore, with respect to the application of the soft switching technique to a polarity inverting type step up/down chopper in which the voltage of the piezoelectric element 109 (charge storage element) described with reference to FIG. 26 is reduced to zero or less, it is needed to establish a soft switching circuit that is optimal in loss, cost and body size to the step up/down chopper in which the voltage of the piezoelectric element 109 (charge storage element) is reduced to zero or less.

SUMMARY

Therefore, it is an object to provide a soft switching circuit that is optimal in loss, cost and body size to a step up/down chopper in which the voltage of a charge storage element is reduced to zero or less.

According to a first aspect, a power control circuit for a charge storage element comprises a first series circuit comprising a DC voltage source, a first switch and an inductor that are connected to one another in series, a second series circuit comprising a second switch, a charge storage element and the inductor that are connected to one another in series, a capacitance component connected to at least one of the group consisting of the first switch, the second switch, and the inductor in parallel, and a control circuit for ON/OFF-controlling the first switch and the second switch, wherein the control circuit repeats a first state where the second switch is turned off and the first switch is turned on to make current flow in a closed circuit comprising the DC voltage source, the first switch and the inductor to thereby transfer power between the DC voltage source and the inductor and a second state where the first switch is turned off and the second switch is turned on to make current flow in a closed circuit comprising the second switch, the inductor and the charge storage element to thereby transfer power between the inductor and the charge storage element while interposing between the first state and the second state a third state where both the first switch and the second switch are turned off, and under the third state where both the first switch and the second switch are turned off, the control circuit turns on a switch to be turned on when a voltage across a switch to be turned on is reduced by resonance of a resonance circuit comprising the capacitance component and the inductor after the third state is set by turning off the first and second switches.

According to the first aspect, the following (i) and (ii) are repeated while interposing between (i) and (ii) the third state where both the first switch and the second switch are turned off.

(i) When the second switch is turned off and the first switch is turned on, current flows in the closed circuit comprising the DC voltage source, the first switch and the inductor to transfer power between the DC voltage source and the inductor.

(ii) When the first switch is turned off and the second switch is turned on, current flows in the closed circuit comprising the second switch, the inductor and the charge storage element to transfer power between the inductor and the charge storage element.

Furthermore, under the third state that both the first switch and the second switch are turned off, when the voltage across the switch to be turned on is reduced by the resonance of the resonance circuit comprising the capacitance component and the inductor after the third state is set by turning off the switches, the switch concerned is turned on. Accordingly, the switching loss is reduced. Furthermore, as compared with the circuit construction of FIG. 27, the number of parts can be reduced, and a more cost efficient body size is realized.

According to a second aspect, in the power control circuit for the charge storage element according to the first aspect, a state where the current flowing in the inductor is equal to zero exists, and the control circuit turns off the first switch or the second switch at the time when the inductor current is equal to zero, whereby the switching loss can be further reduced.

According to a third aspect, in the power control circuit for the charge storage element according to the first aspect, at least one of the first switch and the second switch is designed so that a diode is connected to a synchronous rectifying element in a reverse parallel connection style, and the control circuit turns off the synchronous rectifying element when current flows in the synchronous rectifying element, current flows through the diode connected to the synchronous rectifying element in the reverse parallel connection style, whereby power can be transferred.

According to a fourth aspect, in the power control circuit for the charge storage element according to any one of the first to third aspects, the control circuit controls the switching period between the first switch and the second switch to control the power of the charge storage element, whereby the voltage across the charge storage element can be designed in a sinusoidal pattern.

According to a fifth aspect, in the power control circuit for the charge storage element according to any one of the first to fourth aspects, the charge storage element is an element for supplying power to a load connected to the charge storage element, whereby the power control of the load can be performed through the charge storage element.

According to a sixth aspect, in the power control circuit for the charge storage element according to any one of the first to fifth aspects, a plurality of unit circuits each of which comprises the first switch, the inductor, the second switch, and the capacitance component as circuit constituent elements are provided, and a single or plural DC voltage sources and a single or plural charge storage elements are connected to each unit circuit, whereby variation of the output style can be enhanced and the voltage can be increased.

According to a seventh aspect, in the power control circuit for the charge storage element according to the sixth aspect, the control circuit controls the phase in each unit circuit comprising the first switch, the inductor, the second switch, and the capacitance component as the circuit constituent elements in the switching operation of the first switch and the second switch so that the phase is different among the respective unit circuits, whereby output optimization can be performed, and the loss can be reduced by reducing the input/output voltage variation and reducing the voltage variation.

According to an eighth aspect, in the power control circuit for the charge storage element according to the sixth or seventh aspect, plural charge storage elements exist, and the control circuit may control the voltage between one terminal of any first charge storage element and one terminal of any second charge storage element.

According to a ninth aspect, in the power control circuit for the charge storage element according to the sixth or seventh aspect, plural charge storage elements exist, the terminals of each of the charge storage elements are connected to different unit circuits and the control circuit controls the voltage between the terminals of each of the charge storage elements.

According to a tenth aspect, in the power control circuit for the charge storage element according to the sixth or seventh aspects, plural charge storage elements exist, a load is connected to one terminal of any first charge storage element and one terminal of any second charge storage element, and power is supplied to the load, whereby power control of the load can be controlled through the charge storage elements.

According to an eleventh aspect, in the power control circuit for the charge storage element according to the sixth or seventh aspect, a single charge storage element exists, the terminals of the charge storage element are connected to different unit circuits, and a load is connected to the charge storage element, whereby power is supplied to the load.

According to a twelfth aspect, in the power control circuit for the charge storage element according to any one of the first to eleventh aspects, the charge storage element may be a capacitor, a battery or a piezoelectric element.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE PREFERRED EMBODIMENTS

Preferred embodiments will be described hereunder with reference to the accompanying drawings.

First Embodiment

Figure 1:
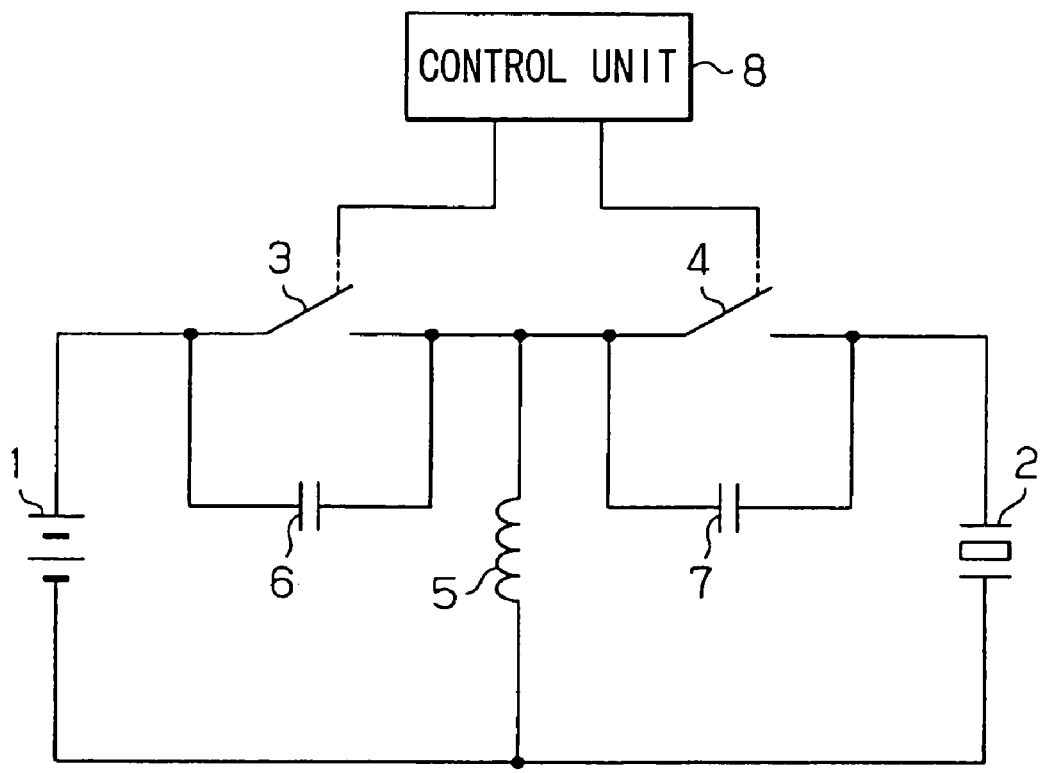
FIG. 1 is a circuit diagram showing the construction of a power control circuit for a charge storage element according to a first embodiment.

FIG. 1 is a circuit diagram showing the construction of a power control circuit for a charge storage element according to the first embodiment for controlling the voltage of a piezoelectric element 2 as a charge storage element.

As shown in FIG. 1, the power control circuit for the charge storage element of this embodiment comprises a DC voltage source 1, a piezoelectric element (charge storage element) 2, a first switch 3, a second switch 4, an inductor 5, a capacitor 6, a capacitor 7 and a control circuit 8. The DC voltage source 1, the switch 3 and the inductor 5 are connected to one another in series to thereby form a first series circuit. The switch 4 and the piezoelectric element (charge storage element) 2 are connected to the inductor 5 in series to thereby form a second series circuit.

Furthermore, the capacitor 6 is connected to the switch 3 in parallel. Likewise, a capacitor 7 is connected to the switch 4 in parallel. The capacitor 6 and the inductor 5 constitute a resonance circuit. Likewise, the capacitor 7 and the inductor 5 constitute a resonance circuit.

The control circuit 8 on/off-controls the switch 3 and the switch 4, makes current flow in the inductor 5 by a chopper system to store power, and transfers this power to the piezoelectric element (charge storage element) 2. That is, power is transferred from the DC voltage source 1 to the piezoelectric element 2 to charge the piezoelectric element 2.

Figure 2:
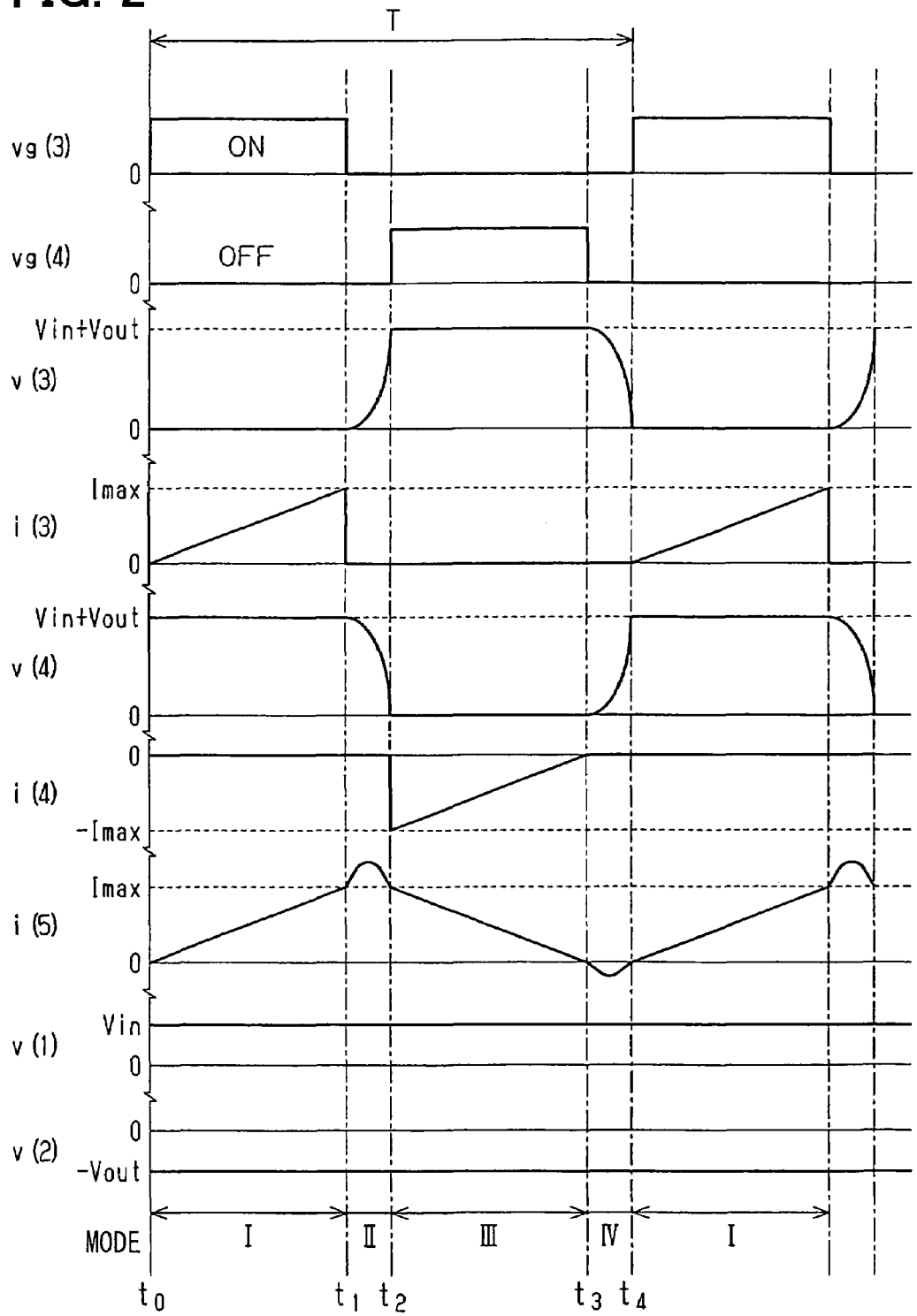
FIG. 2 is a diagram showing the timing, voltage, and current waveforms showing the operation of the power control circuit for the charge storage element.

FIG. 2 is a diagram of the timing, voltage, and current waveforms showing the operation of the power control circuit for the charge storage element of FIG. 1. Specifically, the on/off state of the switch 3, the on/off state of the switch 4, a voltage v(3) between the terminals of the switch 3, current i(3) flowing in the switch 3, a voltage v(4) between the terminals of the switch 4, current i(4) flowing in the switch 4, current i(5) flowing in the inductor 5, a voltage v(1) between the terminals of the DC voltage source 1, and a voltage v(2) between the terminals of the piezoelectric element (charge storage element) 2 are represented from the upper side in FIG. 2.

In FIG. 2, four modes (state) are switched to one another by the on/off operation of the switches 3 and 4. That is, the modes are switched like mode I→mode II→mode III→mode IV→mode I→ . . . FIGS. 3A-3D show a current flowing route in each mode.

The circuit operation of FIG. 1 will be described with reference to FIGS. 2 and 3A-3D. It is assumed that the voltage value of the DC voltage source 1 is fixed during the switching period T of the switch 3 and the switch 4 and also no voltage drop occurs in the switches 3 and 4. Furthermore, the voltage value across the piezoelectric element (charge storage element) 2 (i.e., the voltage value between the terminals of the piezoelectric element 2) is set to be constant by the switching operation of the switches 3 and 4, thereby keeping a strain amount constant.

Figure 3A:
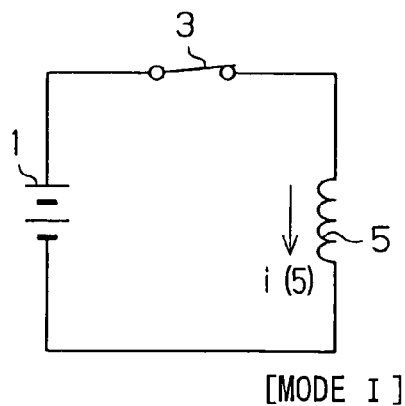
FIGS. 3A-3D are circuit diagrams showing a current flowing route in each mode.
Figure 3B:
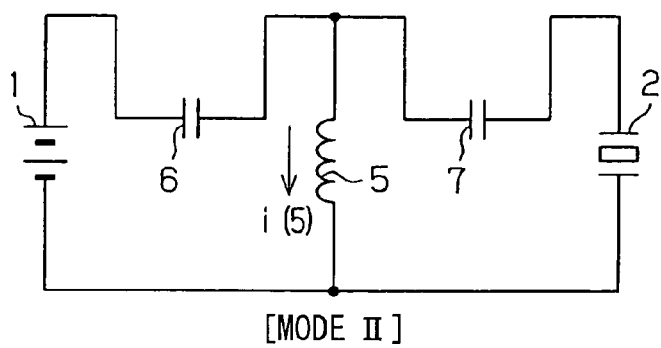
Figure 3C:
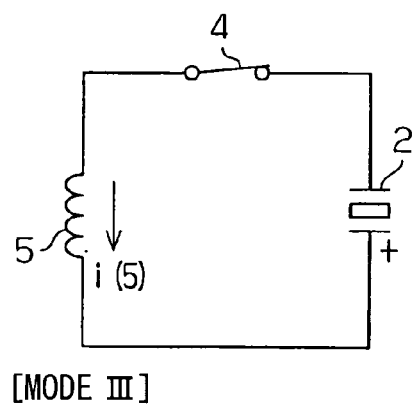
Figure 3D:
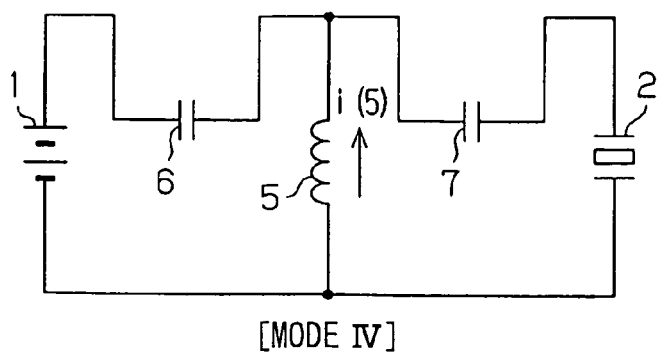

Under an initial state indicated by a timing of t0 in FIG. 2, the switch 4 is turned off and the switch 3 is turned on. The period when the switch 4 is turned off and the switch 3 is turned on is set as a mode I. In mode I, a closed circuit including the DC voltage source 1, the switch 3 and the inductor 5 is formed as shown in FIG. 3A, current i(5) flows from the DC voltage source 1 through the switch 3 to the inductor 5, and this current i(5) increases with respect to the time as shown in FIG. 2.

At the last time point t1 of the mode I, the inductor 5 stores the following electrical energy E.

$$E = (1/2) \cdot L \cdot (Imax)^2$$

Here, L: inductance value of inductor 5, Imax: current value of inductor 5 at t1.

As described above, the first switch 3 is turned on, and current flows in the inductor 5 in the circuit including the DC power source voltage 1, the first switch 3 and the inductor 5 which are connected in series. At this time, power is stored in the inductor 5.

The switch 3 is turned off at the timing t1 of FIG. 2, and thus the mode is shifted from the mode I to the mode II. That is, both the first switch 3 and the second switch 4 are turned off. In the mode II, the DC voltage source 1, the capacitor 6, and the inductor 5 are connected to one another in series to thereby form the first series circuit, and also the inductor 5, the capacitor 7, and the piezoelectric element 2 are connected to one another in series to thereby form the second series circuit. In this case, the capacitors 6 and 7 and the inductor 5 constitute a resonance circuit. At the time when the switch 3 is turned off at t1 of FIG. 2, the capacitor 6 operates as a snubber, and thus the time variation rate of the voltage v(3) across the switch 3 is reduced to a less level as compared with a case where no capacitor 6 is provided, so that the switching loss can be reduced. That is, the soft switching can be implemented.

The period of the mode II corresponds to a period for which the resonance between the inductor 5 and the capacitor 6 and the resonance between the inductor 5 and the capacitor 7 occur simultaneously with each other from the time when the current i(5) flowing in the inductor 5 becomes Imax. Through this resonance, the voltage v(3) across the switch 3 is slowly increased, and the voltage v(4) across the switch 4 is slowly reduced.

At the timing t2 of FIG. 2, the switch 4 is turned on and the mode is shifted from the mode II to the mode III. That is, when the voltage v(4) across the switch 4 is reduced by the resonance of the resonance circuit comprising the capacitors 6, 7 and the inductor 5, the switch 4 is turned on to shift the mode to the mode III. At the time when the switch 4 is turned on at t2 of FIG. 2, the voltage (4) of the switch 4 has been already reduced, and thus the switching loss is reduced. That is, the soft switching is implemented. Particularly, the zero voltage switching can be performed under the state that the voltage across the switch 4 is equal to zero, and the switching loss can be reduced to zero in principle.

In the mode II, the switch 3 is turned off and the switch 4 is turned on, a closed circuit is formed by the inductor 5, the switch 4, and the piezoelectric element 2 as shown in FIG. 3, and current i(5) flows in the inductor 5. In the period of the mode III, after the switch 4 is turned on, the current i(5) flowing in the inductor 5 is reduced by the voltage across the piezoelectric element 2. This is because (the voltage across) the piezoelectric element 2 is negatively charged.

As described above, the second switch 4 is turned on, and the current i(5) flows in the inductor 5 of the circuit including the second switch 4, the inductor 5, and the piezoelectric element 2 which are connected to one another in series. At this time, the power accumulated in the inductor 5 is transferred to the piezoelectric element 2.

When the current i(5) flowing in the inductor 5 is reduced to zero in FIG. 2 (the timing t3 of FIG. 2), the switch 4 is turned off and the mode is shifted from the mode III to the mode IV. That is, the state that the current i(5) flowing in the inductor 5 is equal to zero exists, and the control circuit 8 turns off the switch at the time when the inductor current i(5) is equal to zero. This operation can further reduce the switching loss. In the mode IV where both the first and second switches 3 and 4 are turned off, as shown in FIG. 3, the DC voltage source 1, the capacitor 6, and the inductor 5 are connected to one another in series to thereby form the first series circuit and also the inductor 5, the capacitor 7, and the piezoelectric element 2 are connected to one another in series to thereby form the second series circuit. The capacitors 6 and 7 and the inductor 5 constitute the resonance circuit. The period of the mode IV corresponds to a period for which the resonance between the inductor 5 and the capacitor 6 and the resonance between the inductor 5 and the capacitor 7 occur simultaneously with each other. Through this resonance, the voltage v(3) across the switch 3 in FIG. 2 is slowly reduced, and the voltage v(4) across the switch 4 is slowly increased.

At the timing t4 of FIG. 2, the switch 3 is turned on and the mode is shifted from the mode IV to the mode I again. That is, at the time when the voltage v(3) across the switch 3 is reduced by the resonance of the resonance circuit comprising the capacitors 6 and 7 and the inductor 5, the switch 3 is turned on to shift the mode to the mode I. At the time when the switch 3 is turned on (the timing t4) in FIG. 2, the voltage v(3) of the switch has been already reduced, and the current i(5) flowing in the inductor 5 has been also reduced, so that the switching loss can be reduced. That is, the soft switching can be implemented. Particularly, the zero voltage switching can be performed under the state that the voltage v(3) of the switch 3 is equal to zero, and thus the switching loss can be reduced to zero in principle.

In the mode I, the DC voltage source 1, the switch 3, and the inductor 5 are connected to one another in series to thereby form the first series circuit. After the switch 3 is turned on at the timing t4 of FIG. 2, the current i(5) flowing from the DC voltage source 1 through the switch 3 to the inductor 5 is increased.

The series of operations has been completed as described above.

Figure 4:
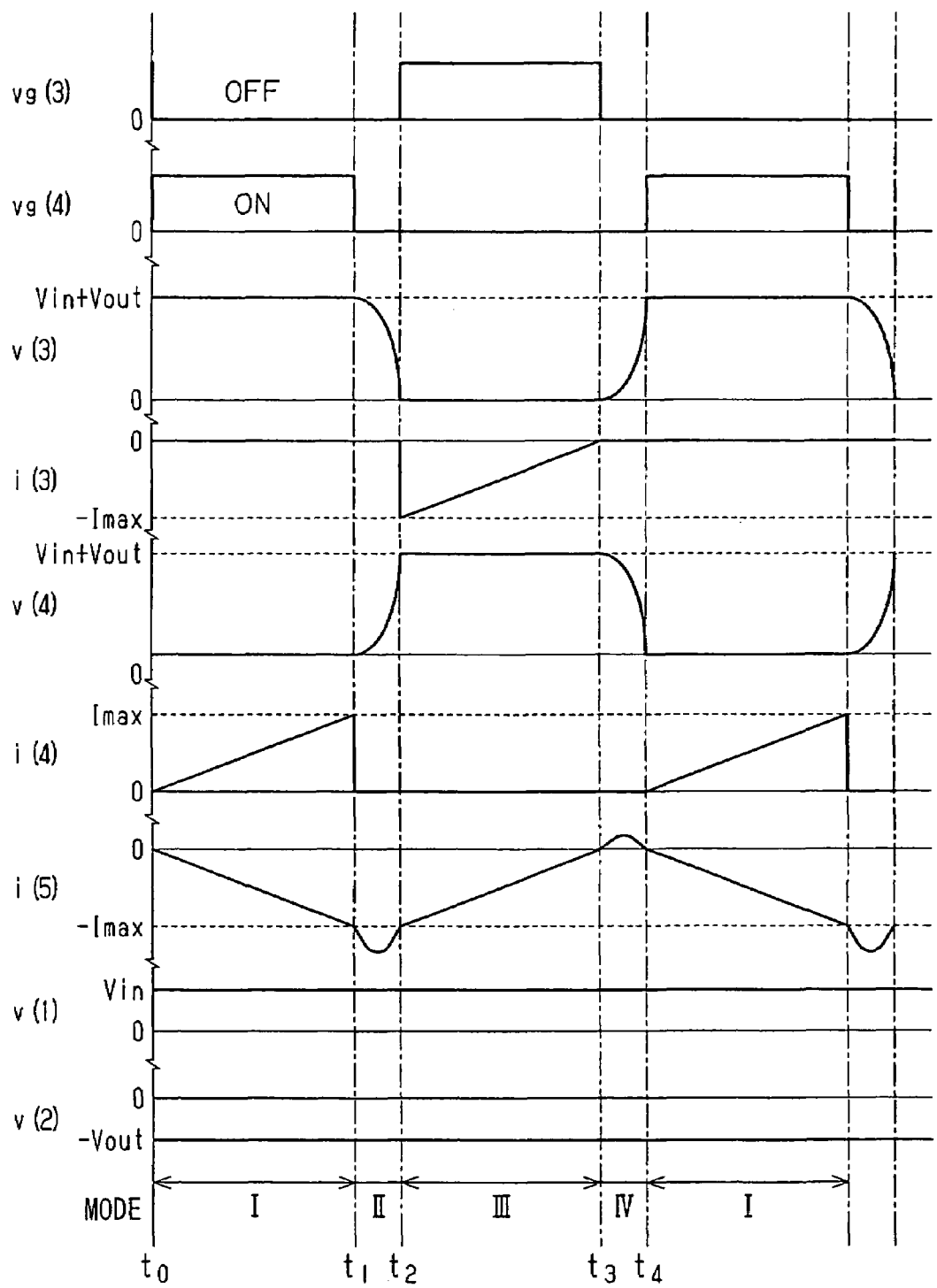
FIG. 4 is a diagram showing the timing, voltage, and current waveforms when a regenerating operation is carried out.

A regenerating operation of making the inductor current i(5) flow in the opposite direction to return the power of the piezoelectric element 2 to the DC voltage source 1 may be carried out. Specifically, the on/off timings of the switches 3, 4 in FIG. 2 are set as shown in FIG. 4 to make the current i(5) flow in the inductor 5 in the opposite direction, thereby carrying out regeneration to the DC voltage source 1. More specifically, the switching operation is carried out by the control circuit 8 as follows.

First, in mode I where the switch 3 is turned off and the switch 4 is turned on, the inductor current i(5) is made to flow in the closed circuit comprising the switch 4, the inductor 5 and the piezoelectric element 2, and then the switch 4 is turned off to shift the mode I to the mode II. At the time when the voltage v(3) across the switch 3 is reduced by the resonance of the resonance circuit comprising the capacitors 6 and 7 and the inductor 5 in the mode II, the switch 3 is turned on to shift the mode II to the mode III. In mode III, the inductor current i(5) is made to flow in the closed circuit comprising the DC voltage source 1, the switch 3, and the inductor 5, and then the switch 3 is turned off to shift the mode III to the mode IV. At the time when the voltage v(4) across the switch 4 is reduced by the resonance of the resonance circuit comprising the capacitors 6 and 7 and the inductor 5 in the mode IV, the switch 4 is turned on to shift the mode IV to the mode I.

Accordingly, in the mode I, the switch 3 is turned off and the switch 4 is turned on, and under this state, the inductor current flows the closed circuit comprising the switch 4, the inductor 5, and the piezoelectric element 2, so that the power is stored in the inductor 5. In the subsequent mode II, both the switch 3 and the switch 4 are turned off, and at the time when the voltage v(3) across the switch 3 is reduced by the resonance of the resonance circuit comprising the capacitors 6, 7 and the inductor 5 under the above state, the switch 3 is turned on (the mode II is shifted to the mode III), so that the switching loss is reduced. In the mode III, under the state that the switch 4 is turned off and the switch 3 is turned on, the inductor current flows in the closed circuit comprising the DC voltage source 1, the switch 3, and the inductor 5, and the power stored in the inductor 5 is transferred to the DC voltage source 1. In the subsequent mode IV, both the switch 3 and the switch 4 are turned off, and at the time when the voltage v(4) across the switch 4 is reduced by the resonance of the resonance circuit comprising the capacitors 6, 7 and the inductor 5 under the above state, the switch 4 is turned on (the mode IV is shifted to the mode I). Accordingly, the switching loss is reduced. Furthermore, the state that the current i(5) flowing in the inductor 5 is equal to zero exists, the control circuit 8 turns off the switch 3 when the inductor current i(5) concerned is equal to zero. With this operation, the switching loss can be further reduced.

As described above, the power is transferred from the piezoelectric element 2 to the DC voltage source 1, and charged piezoelectric element 2 is discharged.

The switch 3 and the switch 4 may be constructed by using MOSFET, IGBT or the like.

Figure 5:
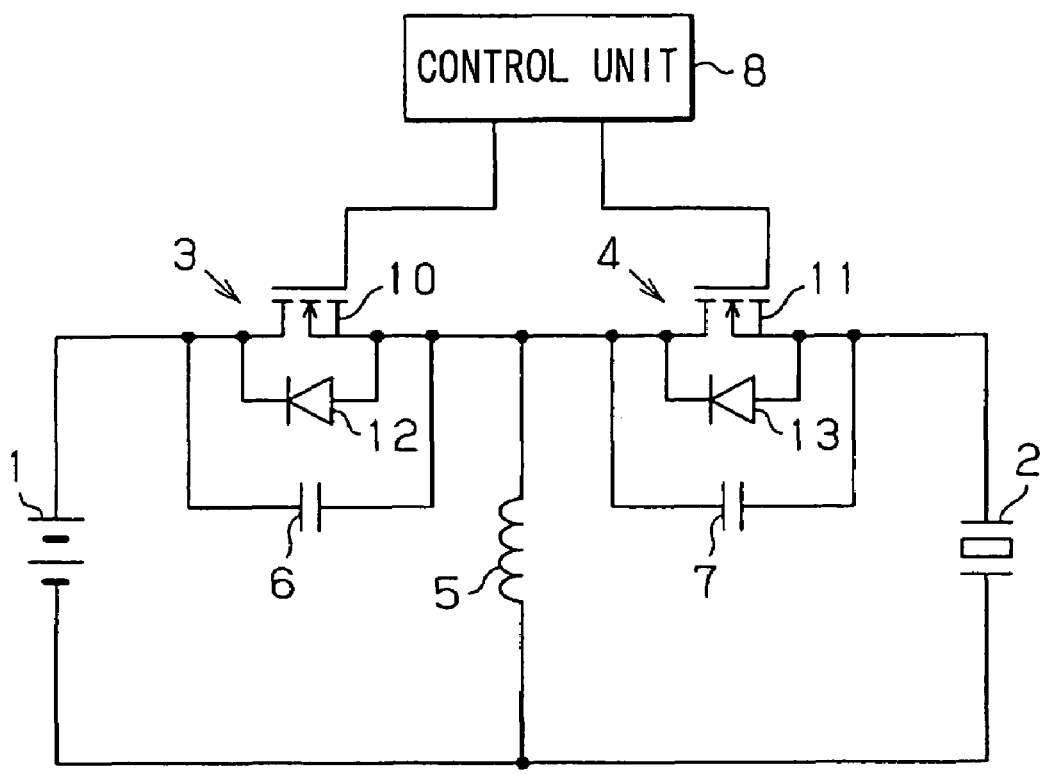
FIG. 5 is a circuit diagram showing the construction of a power control circuit for a charge storage element when MOSFET is used.

FIG. 5 shows the construction of a power control circuit for a charge storage element when MOSFET is used.

In FIG. 5, the first switch 3 is designed so that a diode 12 is connected to MOSFET 10 in a reverse parallel connection style. The second switch 4 is designed so that a diode 13 is connected to MOSFET 11 in a reverse parallel connection style. Here, the diodes 12, 13 may be body diodes of the MOSFETs 10, 11 or externally-equipped diodes.

Figure 6:
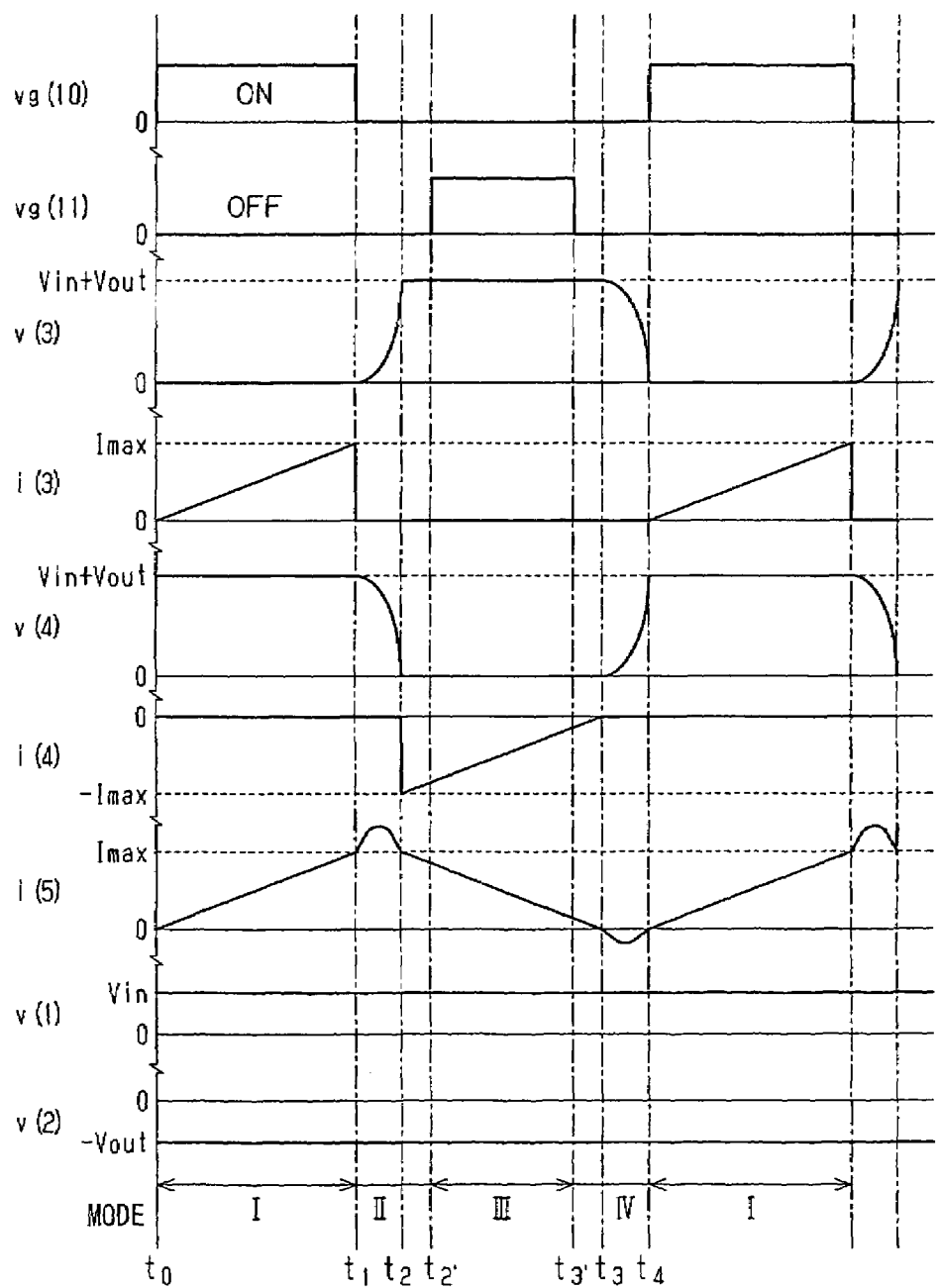
FIG. 6 is a diagram showing the construction of the timing, voltage, and current waveforms showing the operation when MOSFET is used.

No problem occurs in the operation even if the strict condition as shown in FIG. 2 is not applied to the timings of turn-on and turn-off of the second switch 4 (MOSFET 11) under the powering state and the first switch 3 (MOSFET 10) under the regeneration state. FIG. 6 shows the waveform diagram corresponding to FIG. 2. In FIG. 6, the turn-off operation may be carried out by the control circuit 8 at a timing t2' which is delayed from the timing t2. This is because the current i(5) of the inductor 5 of FIG. 5 flows in the diode 13 for the period from t2 to t2'. Furthermore, the turn-off operation may be carried out by the control circuit 8 at a timing t3' which is earlier than the timing of t3 of FIG. 6. This is because the current i(5) of the inductor 5 of FIG. 5 flows in the diode 13 for the period from t3 to t3'. Furthermore, for the period from t2' to t3', the conduction loss can be reduced to a less level by the MOSFET synchronous rectifying operation as compared with a case where the diode is conducted.

As described above, at least one of the first switch 3 and the second switch 4 is designed so that the diode (12, 13) is connected to MOSFET (10, 11) as a synchronous rectifying element in the reverse parallel connection style, and the control circuit 8 turns off (MOSFET 11 at the timing t3' in FIG. 6) at the time when current flows from the source electrode side to the drain electrode side in MOSFET 10, 11. With the above construction, current flows through the diodes 12, 13 which are connected to MOSFETs 10, 11 in the reverse parallel connection style, thereby transferring power. That is, in the case of a circuit for carrying out powering, at least the second switch 4 is designed so that the diode is connected to the first switch 3 in the reverse parallel connection style, and in the case of a circuit for carrying out regeneration, at least the first switch 3 is designed so that the diode is connected to MOSFET in the reverse parallel connection style. Furthermore, the turn-off operation is carried out by the control circuit 8 at the time when current flows in MOSFET. In the case of a circuit for carrying out both powering and regeneration, the first switch 3 and the second switch 4 are designed so that the diodes are connected to MOSFETs in the reverse parallel connection style, and the turn-off operation is carried out by the control circuit 8 at the time when current flows in MOSFET.

In the case of FIG. 2, the switching period is set to a fixed value in order to control the voltage v(2) across the piezoelectric element 2 to be constant. On the other hand, the voltage v(2) across the piezoelectric element 2 may be controlled to be sinusoidal or the like. In order to carry out the output power control as described above, the current value of the inductor 5, that is, the current i(5) flowing in the inductor 5 at the timing t1 of FIG. 2 is made variable in the switching operation. Therefore, the control circuit 8 controls the switching period T of the switches 3 and 4 to control the power of the piezoelectric element 2. That is, the control circuit 8 has a function of freely controlling (outputting) the voltage of the piezoelectric element 2 of FIG. 1 on the basis of a voltage instruction value of the piezoelectric element 2 of the control circuit 8.

Figure 7A:
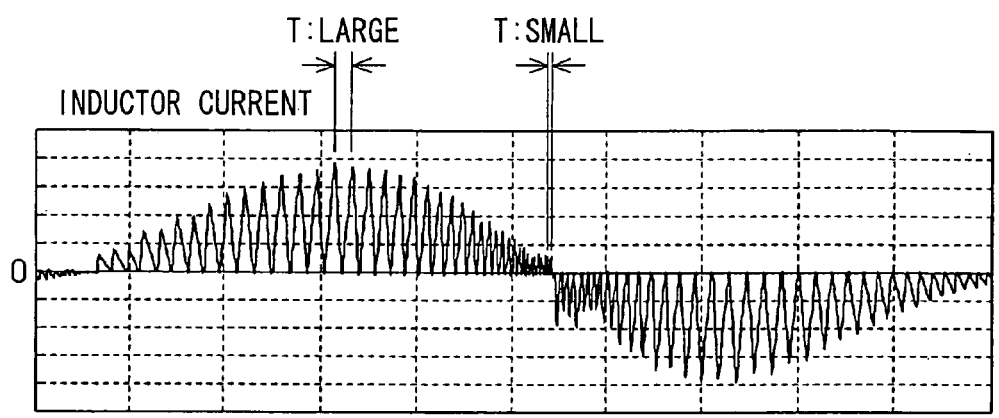
FIGS. 7A-7B are diagrams showing a sinusoidal output waveform and an inductor current waveform.
Figure 7B:
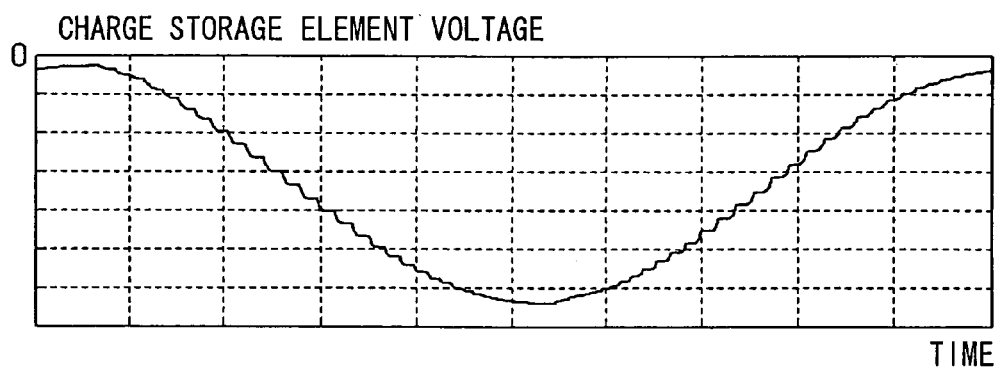

FIG. 7A shows a case where the voltage of the piezoelectric element 2 is controlled by the circuit construction shown in FIG. 5. FIG. 7B shows a case where the voltage of the piezoelectric element (charge storage element) 2 is set to have a sinusoidal waveform, and a sinusoidal waveform is achieved as an output voltage of the piezoelectric element 2 by setting an inductor current waveform shown in FIG. 7A.

Specifically, the output voltage can be greatly varied by lengthening the switching period T, and the output voltage can be slightly varied by shortening the switching period T. By varying the switching period T and thus varying the output voltage as described above, the waveform of the voltage of the piezoelectric element 2 can be set to a sinusoidal waveform (output a sinusoidal wave).

Furthermore, in the circuit construction of FIG. 5, the capacitors 6 and 7 may be constructed by parasitic capacitance components of MOSFET 10 (switch 3) and MOSFET 11 (switch 4). That is, the resonance capacitance component may be the capacitors 6, 7 or the parasitic capacitance components of the switches.

Figure 8:
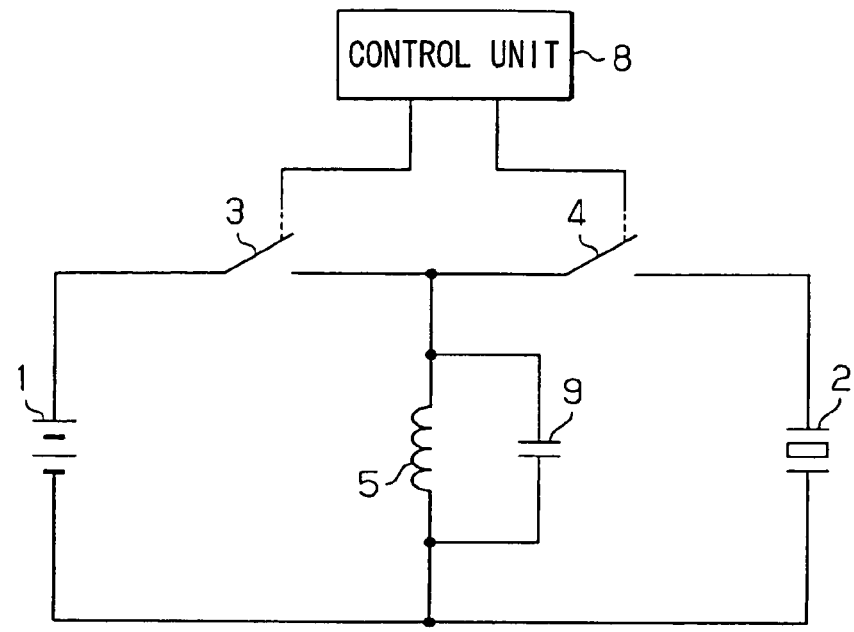
FIG. 8 is a circuit diagram showing the construction of the power control circuit for the charge storage element.

Furthermore, in FIG. 1, the capacitors (capacitance components) are connected to the first and second switches 3 and 4 in parallel to thereby constitute a resonance circuit. In place of this construction, a capacitor (capacitance component) may be connected to a only the first switch 3 in parallel to constitute a resonance circuit, or a capacitor (capacitance component) may be connected to only the second switch 4 in parallel to constitute a resonance circuit. Or, as shown in FIG. 8, a capacitor (capacitance component) 9 may be connected to the inductor 5 in parallel to constitute a resonance circuit. As described above, the capacitor (capacitance component) 6, 7, 8 may be connected to at least one of the group consisting of the first switch 3, the second switch 4 and the inductor 5 in parallel.

Figure 9:
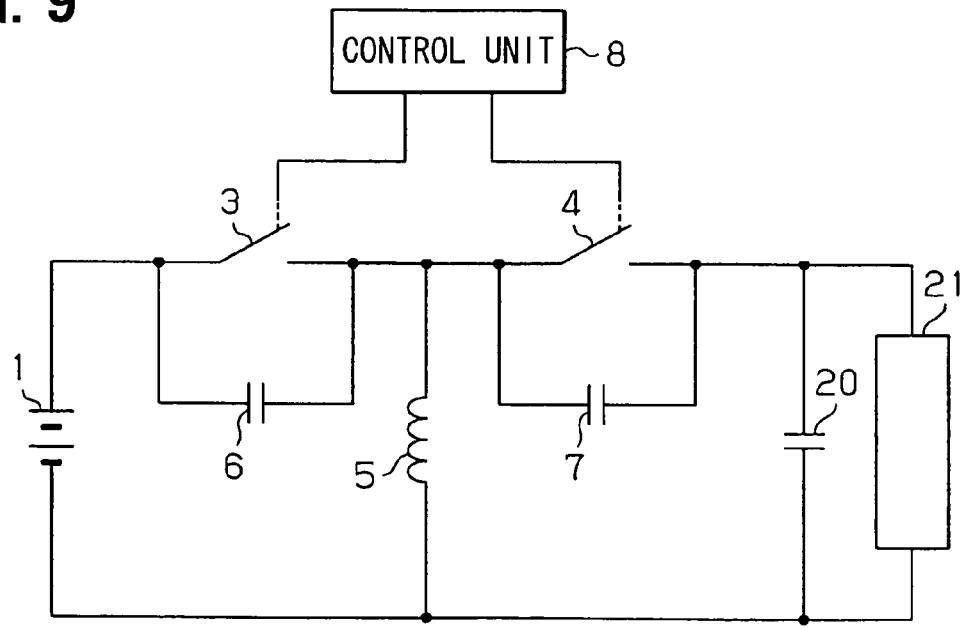
FIG. 9 is a circuit diagram showing the construction of the power control circuit for the charge storage element.

Furthermore, as shown in FIG. 9, a capacitor 20 is used as a charge storage element and a load 21 may be connected to the capacitor 20 by using this capacitor 20 so that power is supplied from the capacitor 20 as the charge storage element to the load 21. In this case (the case where power control of the load 21 through the capacitor 20 is carried out), the content (operation and effect) described in this embodiment is likewise satisfied.

Furthermore, a battery may be used as the charge storage element in place of the piezoelectric element 2 and the capacitor 20. The first embodiment described above has the following feature.

Figure 27:
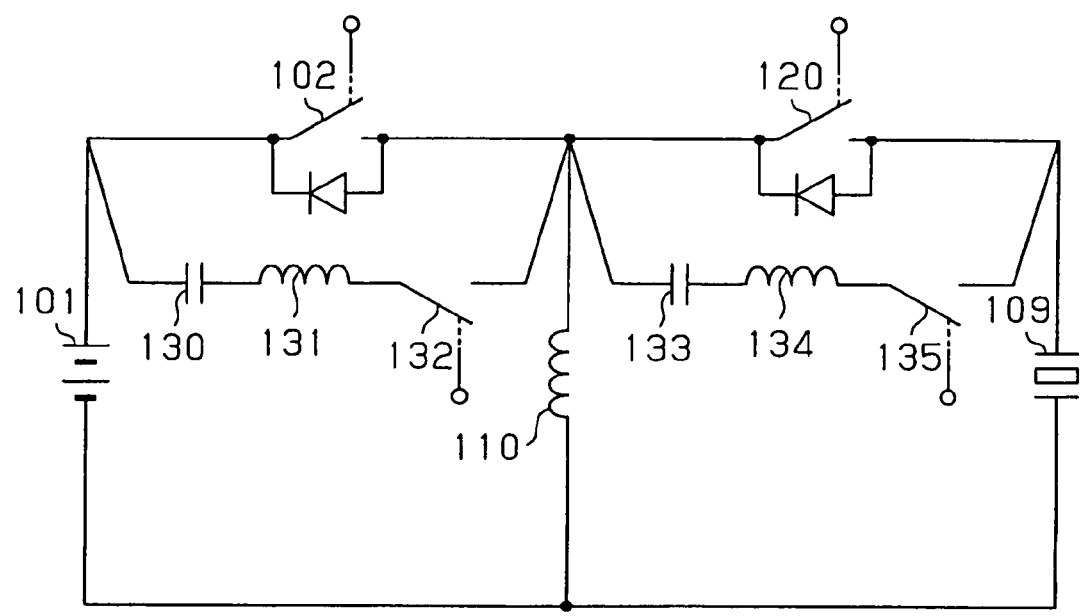
FIG. 27 is a circuit diagram showing a step up/down chopper circuit.

The control circuit repeats a first state where the second switch 4 is turned off and the first switch 3 is turned on to make current flow in the closed circuit comprising the DC voltage source 1, the first switch 3, and the inductor 5 to thereby transfer power between the DC voltage source 1 and the inductor 5 and a second state where the first switch 3 is turned off and the second switch 4 is turned on to make current flow in the closed circuit comprising the second switch 4, the inductor 5, and the charge storage element 2 to thereby transfer power between the inductor 5 and the charge storage element 2 while interposing between the first state and the second state a third state where both the first switch 3 and the second switch 4 are turned off, and under the third state where both the first switch 3 and the second switch 4 are turned off, the control circuit 8 turns on a switch 3,4 to be turned on when a voltage across the switch 3,4 to be turned on is reduced by resonance of a resonance circuit comprising the capacitance component 6,7,9 and the inductor 5 after the third state is set by turning off the first and second switches. Accordingly, the switching loss can be reduced. Furthermore, the number of parts can be reduced to be less than that of the circuit construction of FIG. 27, and this circuit construction is more excellent in cost and body size. As a result, in the step up/down chopper in which the voltage of the charge storage element is equal to zero or less, a soft switching circuit construction that is optimal in loss, cost and body size can be provided.

Second Embodiment

A second embodiment will be described with emphasis on differences with the first embodiment.

In the first embodiment, the circuit is constructed by using the members represented by the reference numerals 3, 4, 5, 6, 7 in FIG. 1. On the other hand, in this embodiment, a circuit comprising members represented by the reference numerals 3, 4, 5, 6, 7 is set as a unit circuit, and a circuit construction is established by using a plurality of unit circuits described above.

Figure 10:
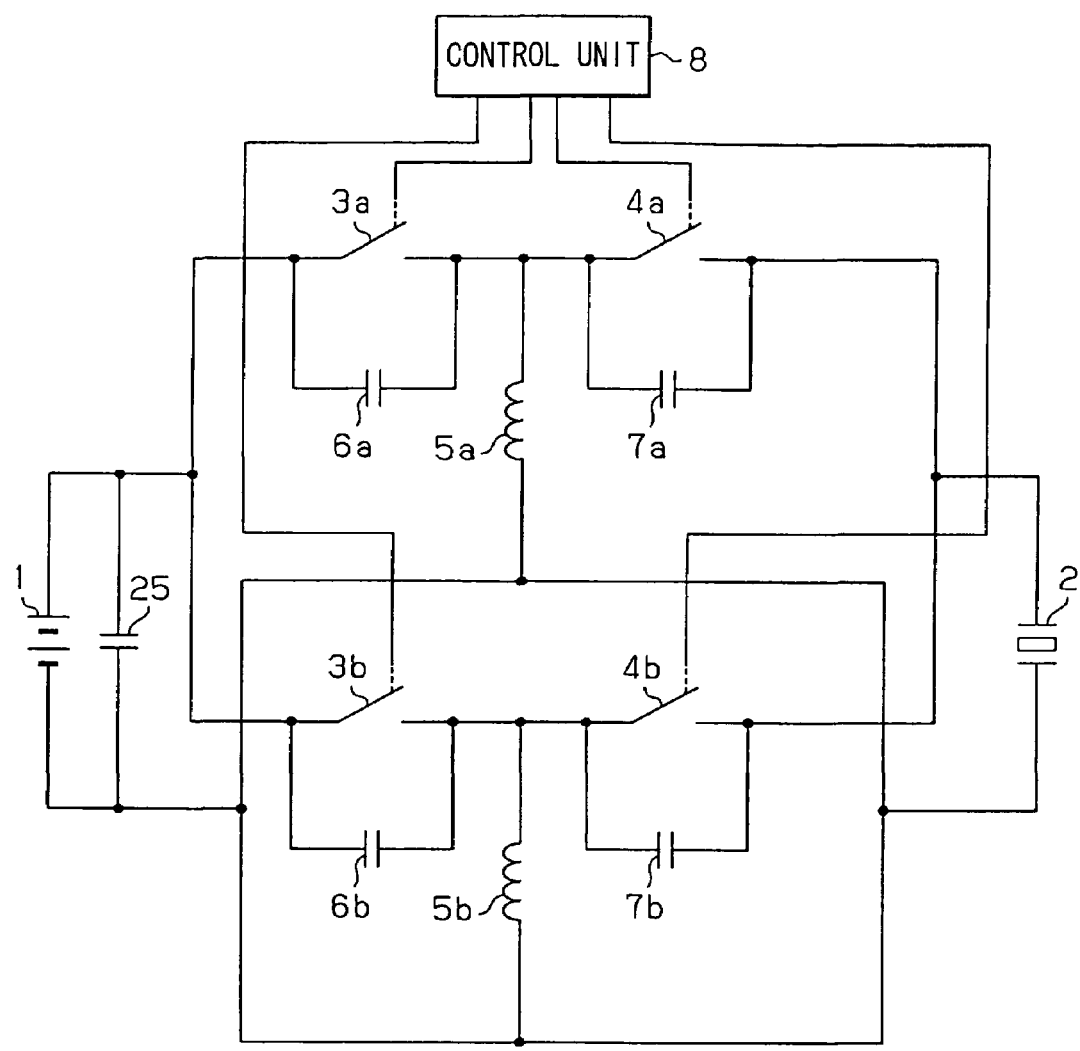
FIG. 10 is a circuit diagram showing the construction of a power control circuit for a charge storage element according to a second embodiment.

FIG. 10 is a circuit diagram showing a power control circuit for a charge storage element according to this embodiment. In FIG. 10, a single DC voltage source 1 and a single piezoelectric element (charge storage element) 2 are used. Furthermore, a first unit circuit comprises a switch 3a, a switch 4a, an inductor 5a, a capacitor 6a, and a capacitor 7a. The DC voltage source 1, the switch 3a, and the inductor 5a are connected to one another in series, and the inductor 5a, the switch 4a, and the piezoelectric element 2 (charge storage element) are connected to one another in series. Furthermore, the capacitor 6a is connected to the switch 3a in parallel, and the capacitor 7a is connected to the switch 4a in parallel. The capacitor 6a and the inductor 5a constitute a resonance circuit, and the capacitor 7a and the inductor 5a constitute a resonance circuit.

Furthermore, a second unit circuit comprises a switch 3b, a switch 4b, an inductor 5b, a capacitor 6b and a capacitor 7b. The DC voltage source 1, the switch 3b, and the inductor 5b are connected to one another in series, and the inductor 5b, the switch 4b, and the piezoelectric element 2 (charge storage element) are connected to one another in series. Furthermore, the capacitor 6b is connected to the switch 3b in parallel, and the capacitor 7b is connected to the switch 4b in parallel. The capacitor 6b and the inductor 5b constitute a resonance circuit, and the capacitor 7b and the inductor 5b constitute a resonance circuit.

A smoothing capacitor 25 is connected to the DC voltage source 1 in parallel.

Figure 11:
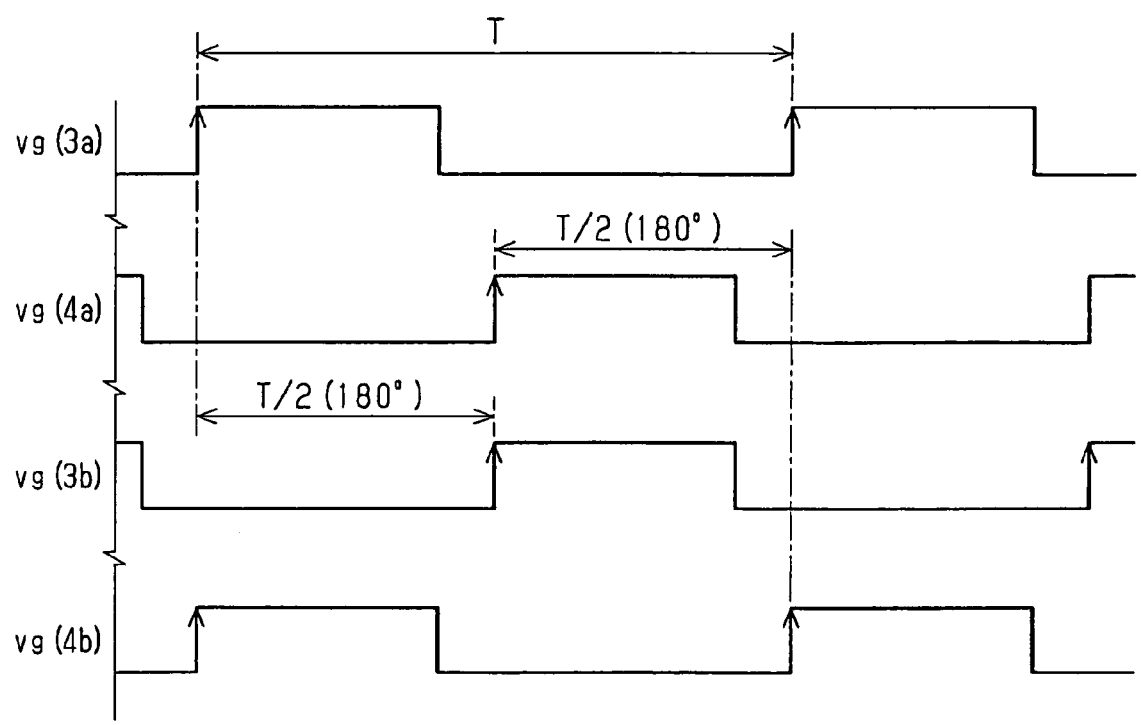
FIG. 11 is a time chart showing on/off timing of a switch.

FIG. 11 shows the on/off timings of the switches 3a, 4a of the first unit circuit and the switches 3b, 4b of the second unit circuit. In FIG. 11, the first unit circuit (switches 3a, 4a) and the second unit circuit (switches 3b, 4b) are displaced in switching phase from each other by about 180 degrees. That is, the rising edge of the driving pulse for the switch 3a and the rising edge of the driving pulse for the switch 3b in FIG. 11 are displaced in phase from each other by about 180 degrees, and also the rising edge of the driving pulse for the switch 4a and the rising edge of the driving pulse for the switch 4b are displaced in phase from each other by about 180 degrees. As described above, the control circuit 8 controls the switching phase in the switching operation of the first and second switches so that the switching phase is different between the respective unit circuits each of which comprises the first switch, the inductor, the second switch, and the capacitor (capacitance component) as the circuit constituent elements (a phase difference is set to the switching period between the respective unit circuits).

Accordingly, the output optimization can be performed, and the switching loss can be reduced by reduction of the input/output voltage variation (reduction of ripple) and reduction of the voltage variation. Specifically, at the input side, the current ripple of the DC voltage source 1 can be reduced and electromagnetic noise can be reduced. Furthermore, at the output side, the output current ripple can be reduced, and electromagnetic noise can be reduced. Furthermore, under a condition that the ripple is fixed, the body size and the cost can be reduced by reducing the capacitance of the input/output smoothening capacitor (the smoothing capacitor 25 in FIG. 10) and reducing the resistance value of the inner resistor of the piezoelectric element 2. Furthermore, when the voltage of a single charge storage element is controlled by connecting plural unit circuits in parallel (the case of FIG. 10), the conducting loss can be reduced if the line width is fixed by parallel connection, and currents are collected in FIG. 10 and supplied to the piezoelectric element, so that the current can be increased.

A capacitor may be used in place of the piezoelectric element 2 in FIG. 10.

Figure 12:
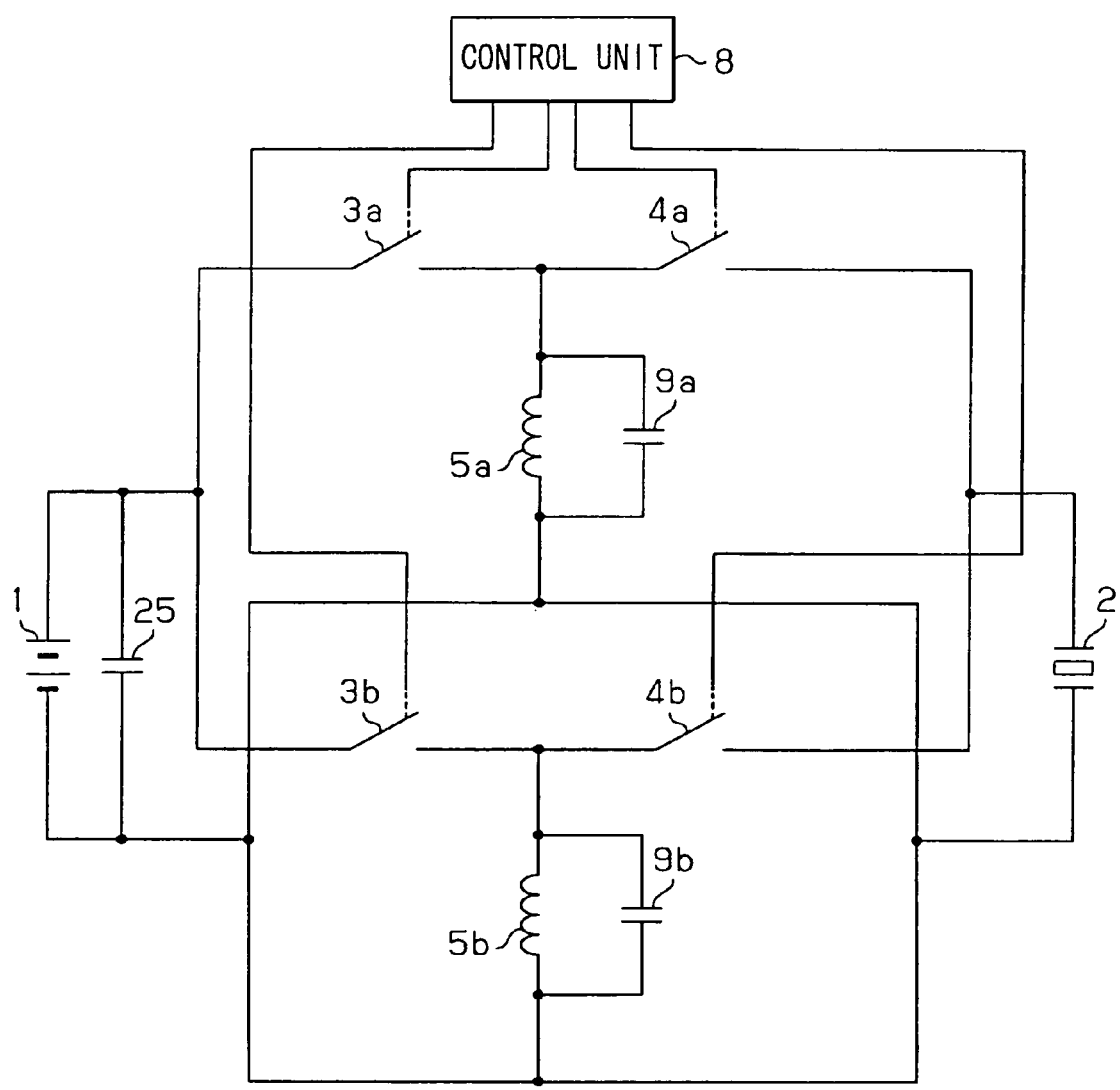
FIG. 12 is a circuit diagram showing the construction of the power control circuit for the charge storage element.

In FIG. 10, the capacitors 6a, 6b, 7a, 7b are connected to the switches 3a, 3b, 4a, 4b in parallel. However, in place of this connection style, the capacitors 9a, 9b may be connected to the inductors 5a, 5b in parallel as shown in FIG. 12. Specifically, the capacitor 9a is connected to the inductor 5a in parallel in the first unit circuit, and the capacitor 9b is connected to the inductor 5b in the second unit circuit.

Modifications will be described hereunder.

Figure 13:
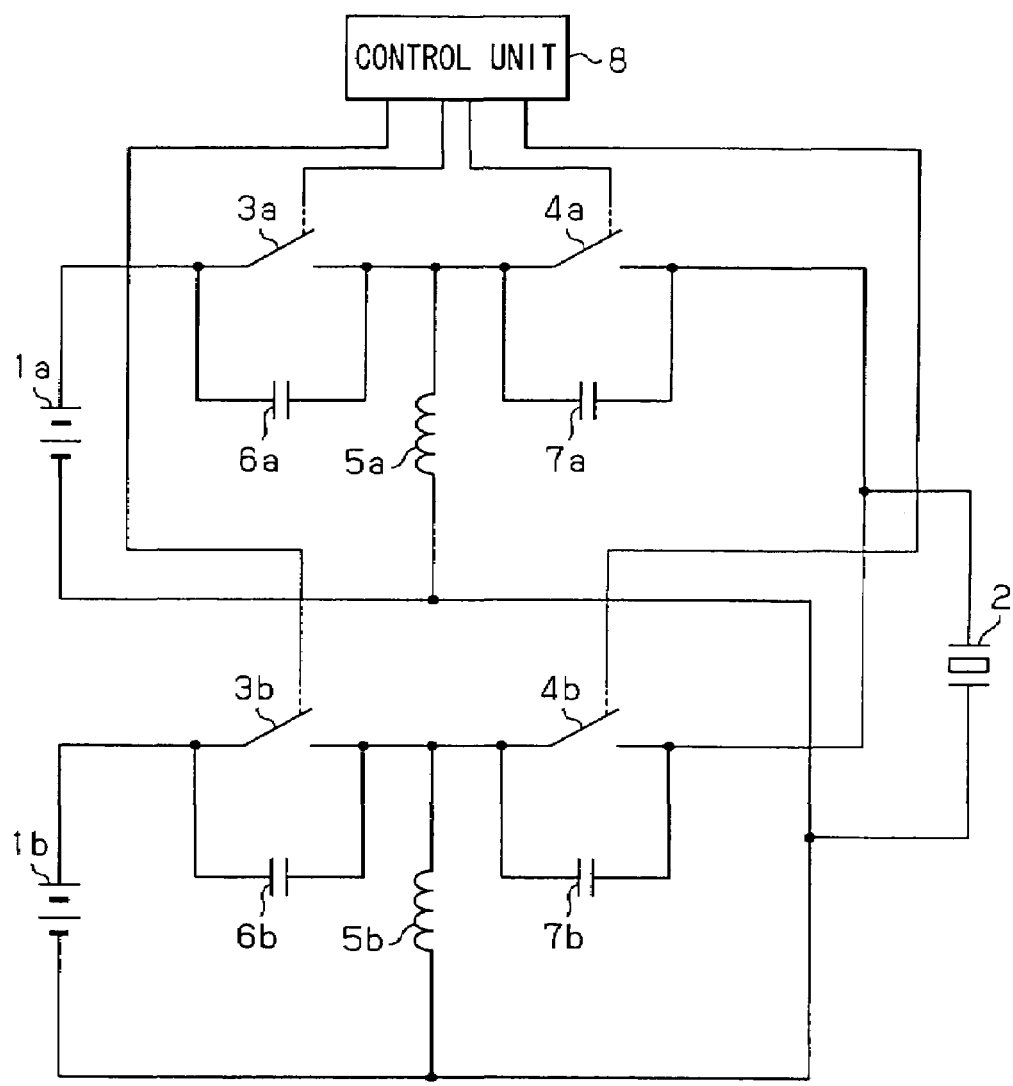
FIG. 13 is a circuit diagram showing the construction of a power control circuit for a charge storage element according to a modification.

A circuit construction shown in FIG. 13 may be used in place of the circuit construction of FIG. 10. In FIG. 13, an independent DC voltage source 1a, 1b is connected to each unit circuit. That is, the DC voltage source 1a, the switch 3a, and the inductor 5a are connected to one another in series, and the inductor 5a, the switch 4a, and the piezoelectric element (charge storage element) 2 are connected to one another in series. Furthermore, the DC voltage source 1b, the switch 3b, and the inductor 5b are connected to one another in series, and the inductor 5b, the switch 4b, and the piezoelectric element (charge storage element) 2 are connected to one another in series.

The same effect (ripple reducing effect) can be achieved at the piezoelectric element 2 side of the circuit construction shown in FIG. 13.

Figure 14:
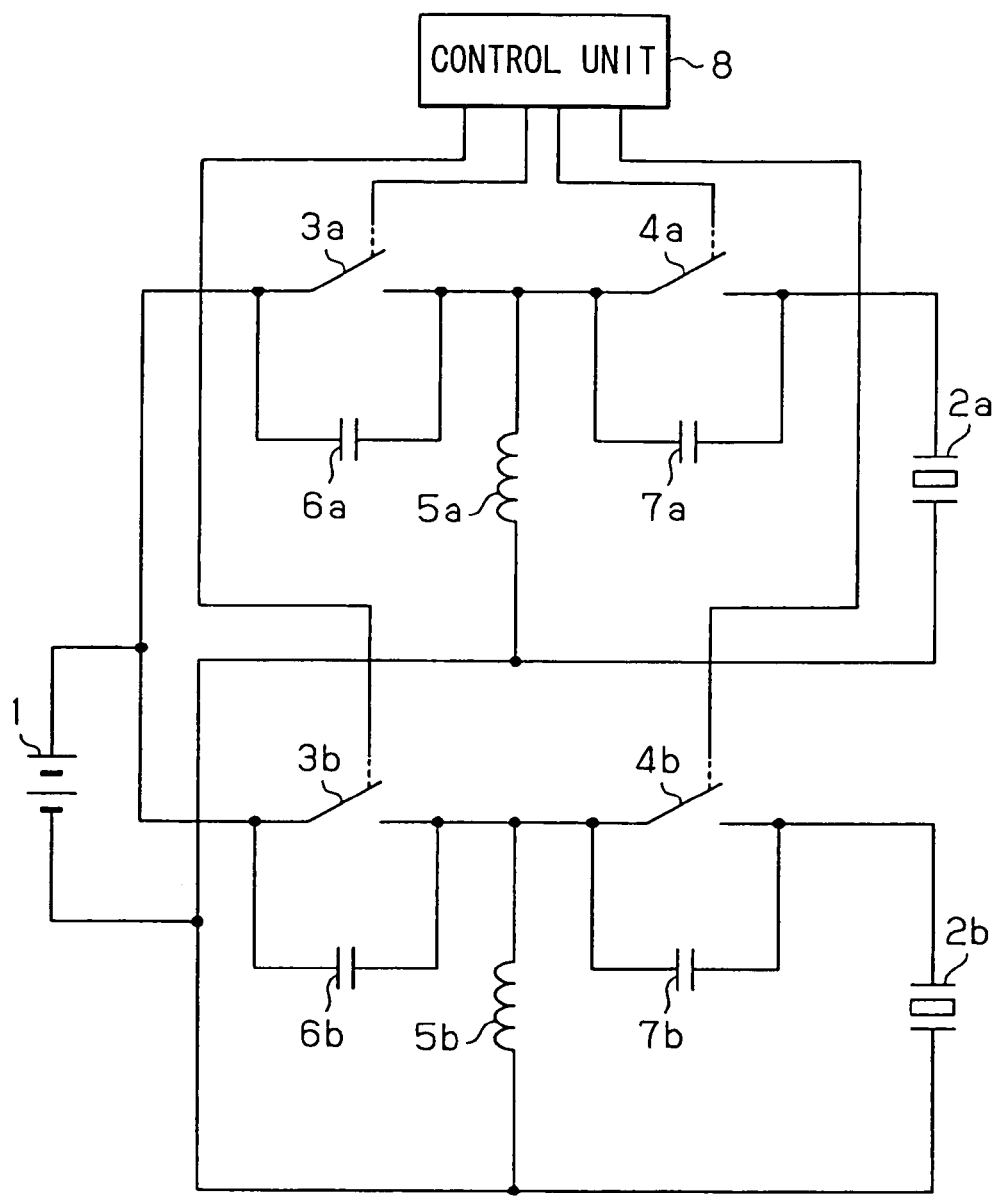
FIG. 14 is a circuit diagram showing the construction of a power control circuit for a charge storage element according to a modification.

Furthermore, a circuit construction shown in FIG. 14 may be used in place of the circuit construction of FIG. 10. In FIG. 14, an independent piezoelectric element (charge storage element) 2a, 2b is connected to each unit circuit. That is, the DC voltage source 1, the switch 3a, and the inductor 5a are connected to one another in series, and the inductor 5a, the switch 4a, and the piezoelectric element (charge storage element) 2a are connected to one another in series. Furthermore, the DC voltage source 1, the switch 3b, and the inductor 5b are connected to one another in series, and the inductor 5b, the switch 4b, and the piezoelectric element (charge storage element) 2b are connected to one another in series.

The same effect (ripple reducing effect) can be achieved at the DC voltage source 1 side of the circuit construction of FIG. 14.

Figure 15:
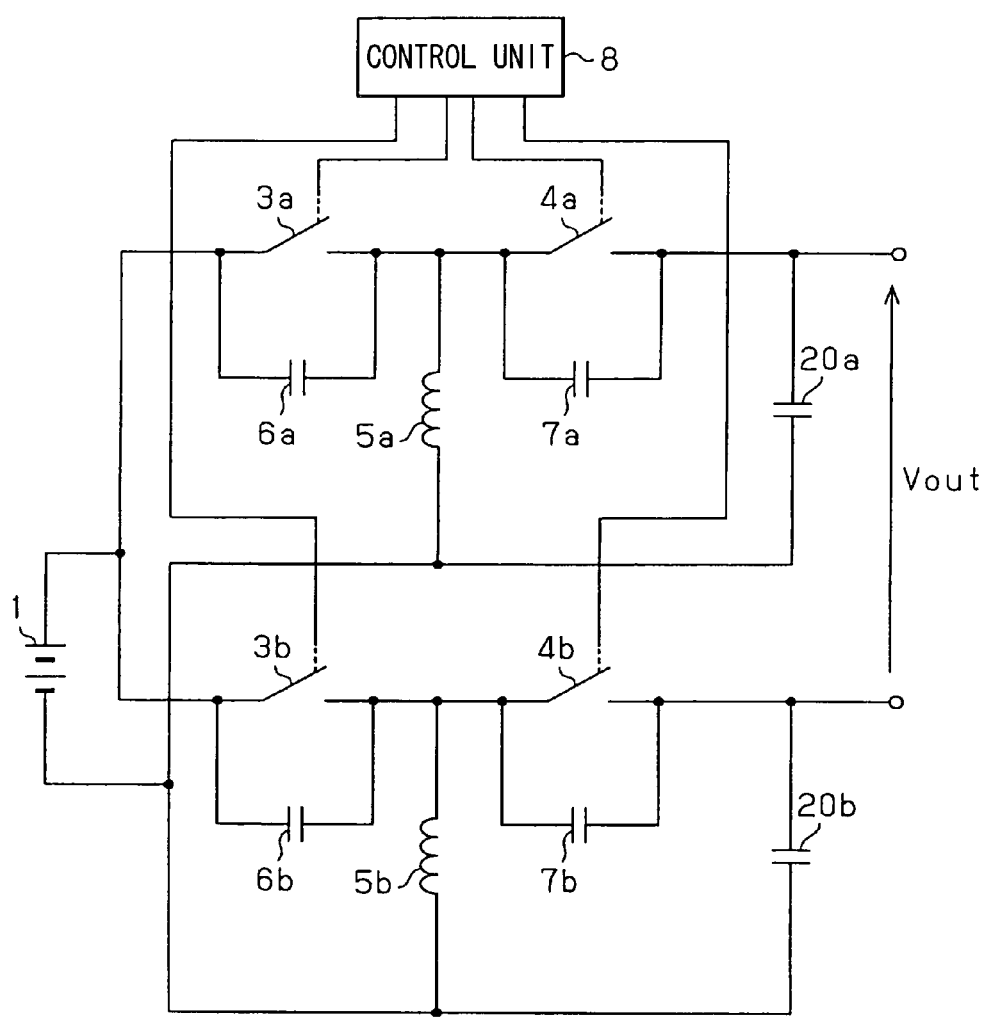
FIG. 15 is a circuit diagram showing the construction of a power control circuit for a charge storage element according to a modification.

A circuit construction shown in FIG. 15 may be used in place of the circuit construction of FIG. 14. In FIG. 15, the voltages of plural capacitors (charge storage elements) 20a, 20b are controlled with respect to a single DC voltage source 1, and the control circuit 8 controls the voltage Vout between one terminals of the capacitors (charge storage elements) 20a, 20b in FIG. 15. In a broad sense, plural capacitors (20a, 20b) exist, and the control circuit 8 controls the voltage Vout between one terminal of any capacitor 20a and one terminal of any capacitor 20b. By controlling the difference Vout between the output voltages of the capacitors (charge storage elements) 20a, 20b, variation of the output voltage (output style) can be increased.

Figure 16:
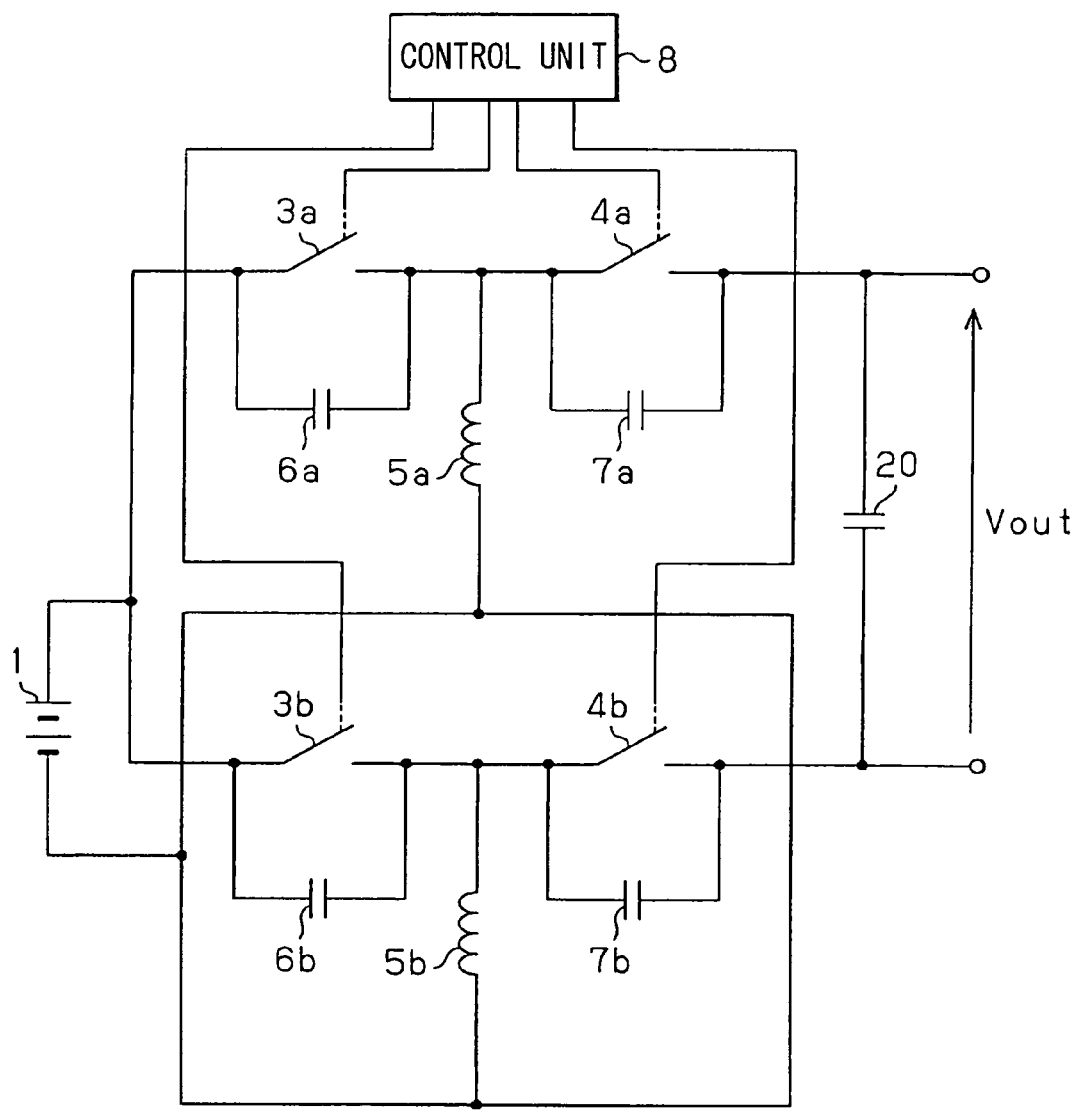
FIG. 16 is a circuit diagram showing the construction of a power control circuit for a charge storage element according to a modification.

Furthermore, a circuit construction shown in FIG. 16 may be used. In FIG. 16, the DC voltage source 1, the switch 3a, and the inductor 5a are connected to one another in series. Furthermore, the DC voltage source 1, the switch 3b, and the inductor 5a are connected to one another in series. Furthermore, the inductor 5a, the switch 4a, the capacitor (charge storage element) 20, the switch 4b, and the inductor 5b are connected to one another in series. As described above, the capacitor (charge storage element) 20 may be connected to each unit circuit in series. That is, a single charge storage element 20 exists, the terminals of the charge storage element 20 are connected to different unit circuit, and the control circuit 8 controls the voltage Vout between the terminals of the charge storage element.

Figure 17:
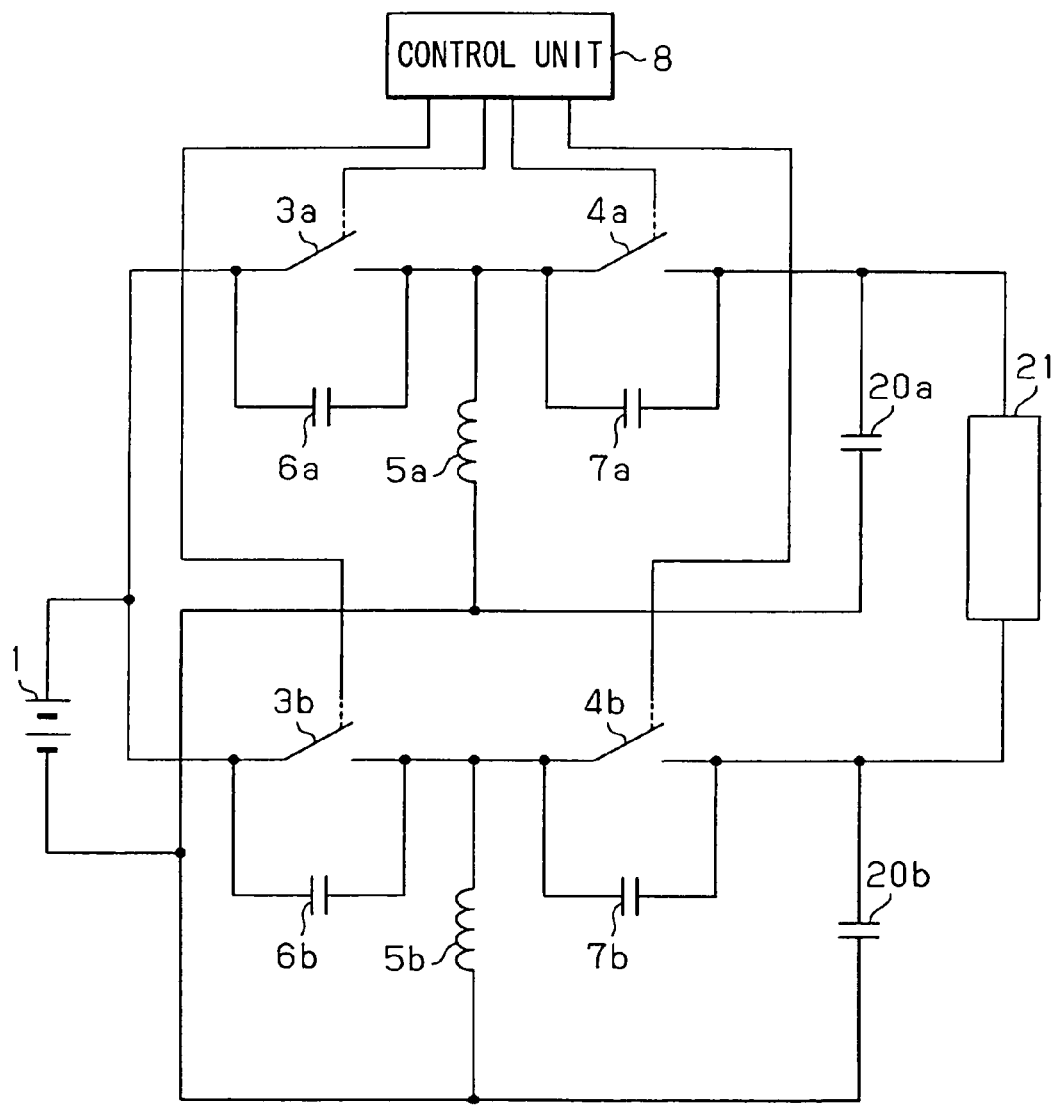
FIG. 17 is a circuit diagram showing the construction of a power control circuit for a charge storage element according to a modification.

Still furthermore, as shown in FIG. 17, the voltages of plural capacitors (charge storage elements) 20a, 20b are controlled with respect to a single DC voltage source 1, and the voltage between one terminals of the capacitors 20a, 20b may be applied to a load 21. At this time, any voltage can be applied to the load 21 by controlling the power of each of the capacitors 20a and 20b. In a broad sense, plural capacitors (20a, 20b) exist, the load 21 is connected to one terminal of any capacitor 20a and one terminal of any capacitor 20b, and power is supplied to the load 21. Accordingly, the power control of the load 21 can be performed through the capacitors 20a, 20b.

Figure 18:
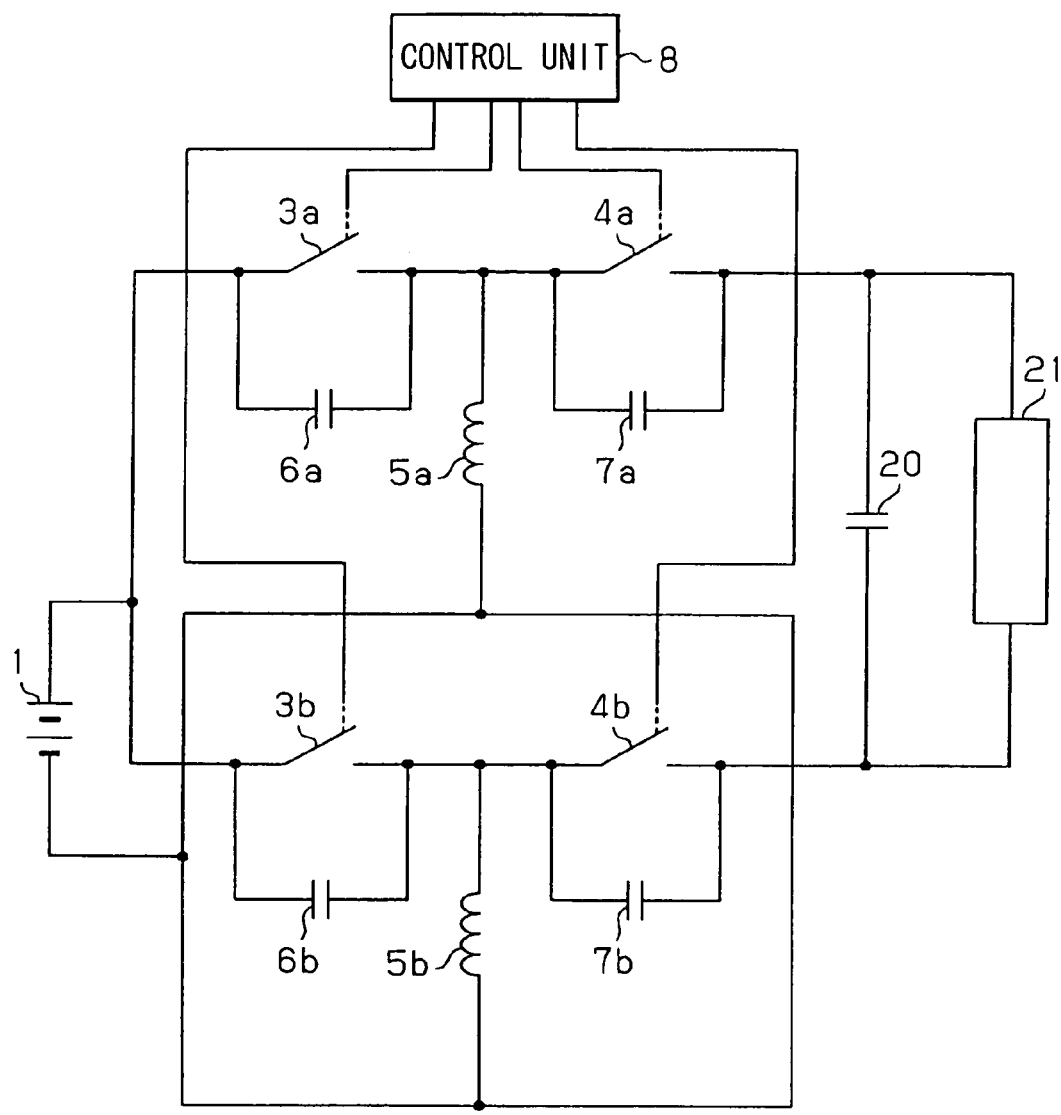
FIG. 18 is a circuit diagram showing the construction of a power control circuit for a charge storage element according to a modification.

As shown in FIG. 18, the voltage between both the terminals of the capacitor (charge storage element) 20 in FIG. 16 can be applied to the load 21. That is, a single charge storage element 20 exists, the terminals of the charge storage element 20 are connected to different unit circuit, and the load 21 is connected to the charge storage element 20 to supply power to the load 21. In the case of FIG. 18, the power control of the load 21 can be performed through the capacitor 20.

Figure 19:
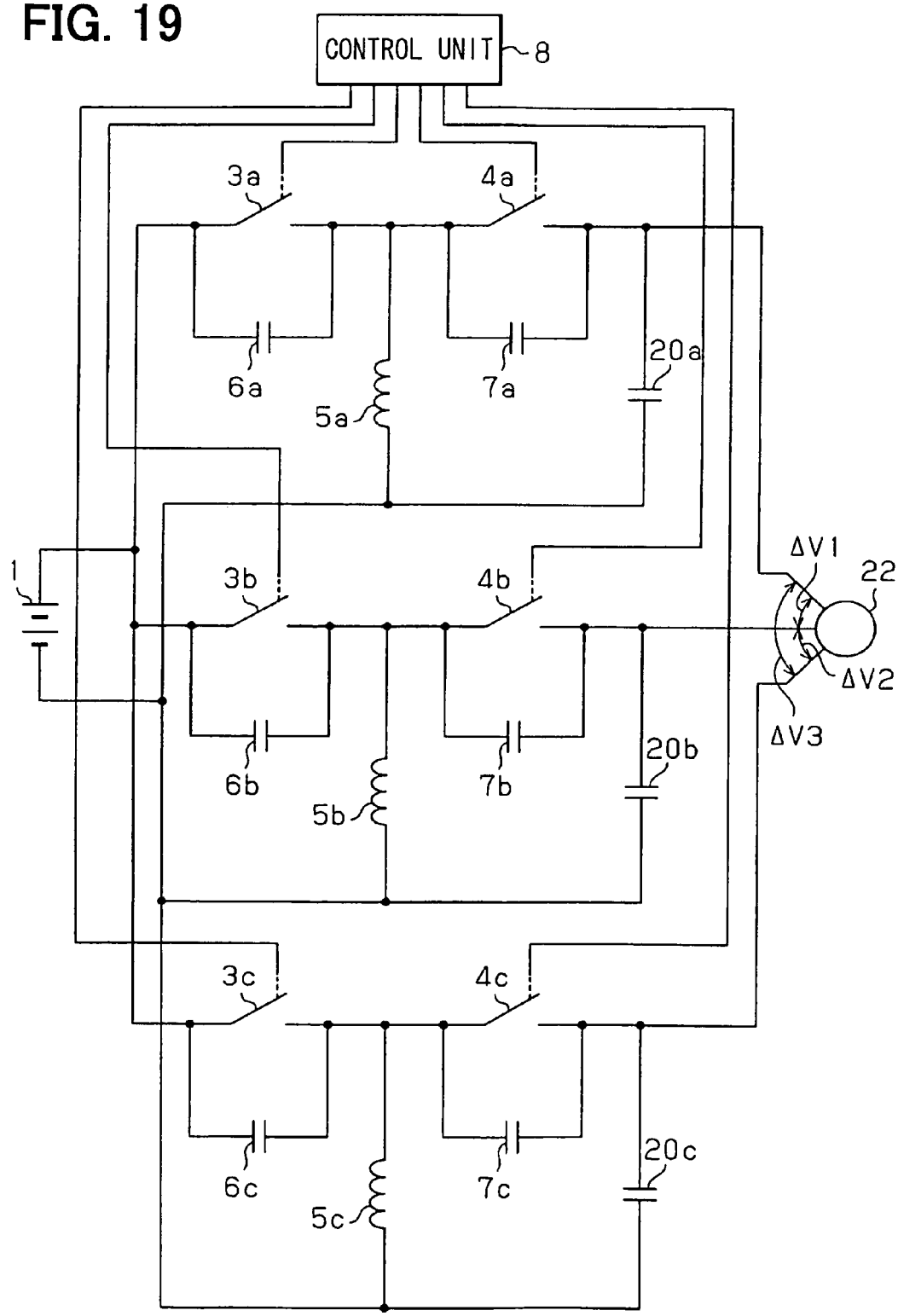
FIG. 19 is a circuit diagram showing the construction of a power control circuit for a charge storage element according to a modification.
Figure 21:
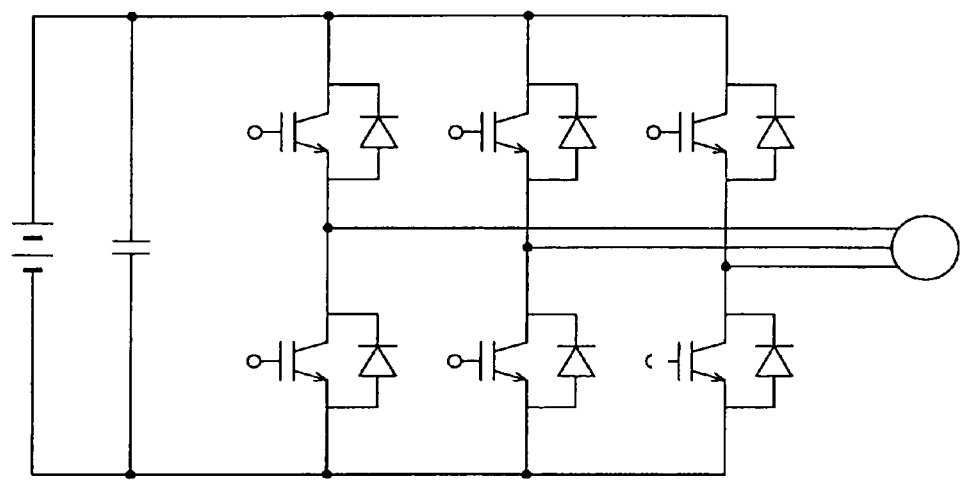
FIG. 21 is a circuit diagram showing a 3-phase PWM control 2-level inverter for comparison.
Figure 22:
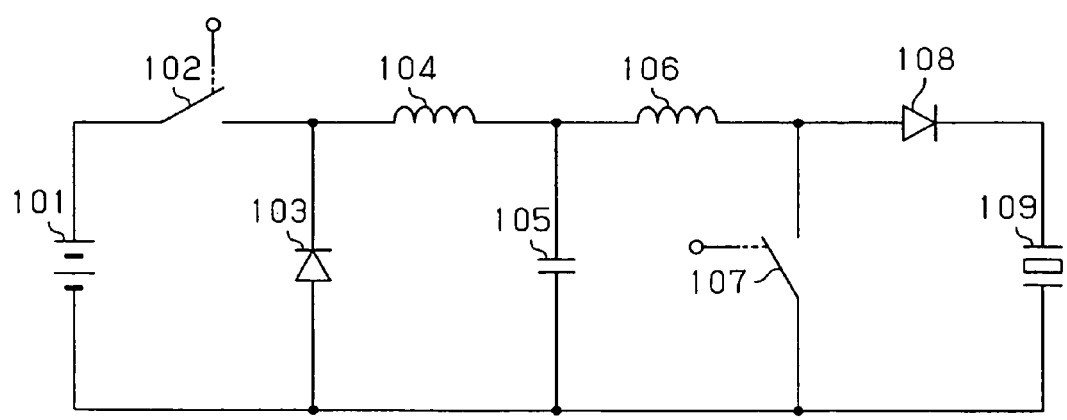
FIG. 22 is a circuit diagram showing a step up/down chopper circuit to describe a background art.
Figure 23:
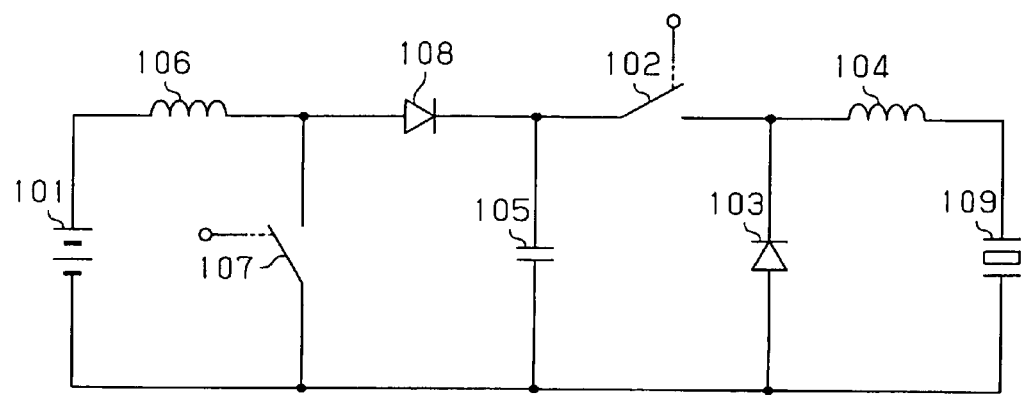
FIG. 23 is a circuit diagram showing a step up/down chopper circuit to describe a background art.
Figure 24:
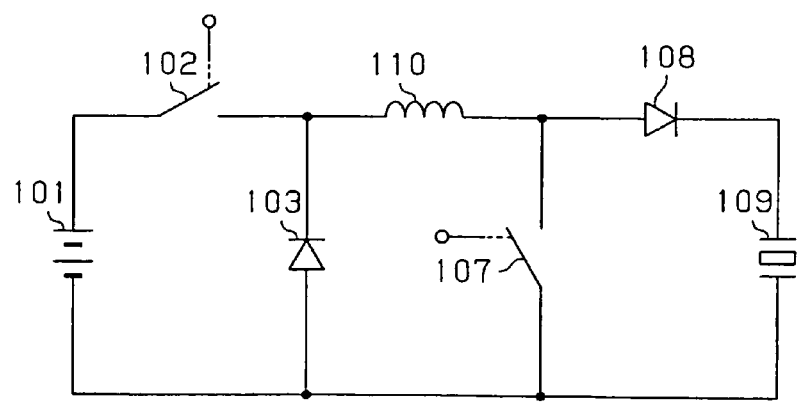
FIG. 24 is a circuit diagram showing a step up/down chopper circuit to describe a background art.
Figure 25:
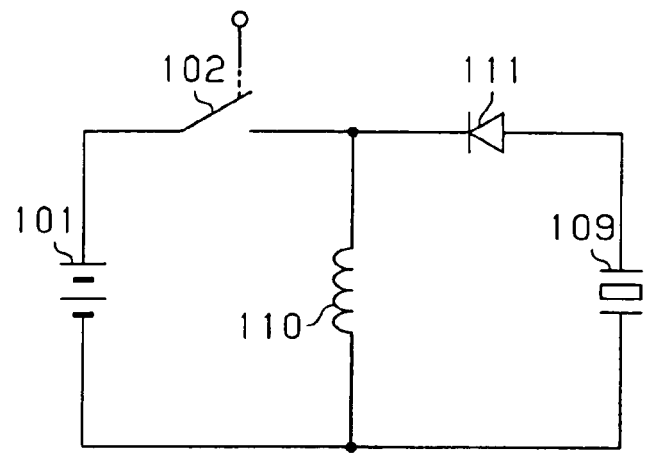
FIG. 25 is a circuit diagram showing a step up/down chopper circuit to describe a background art.
Figure 26:
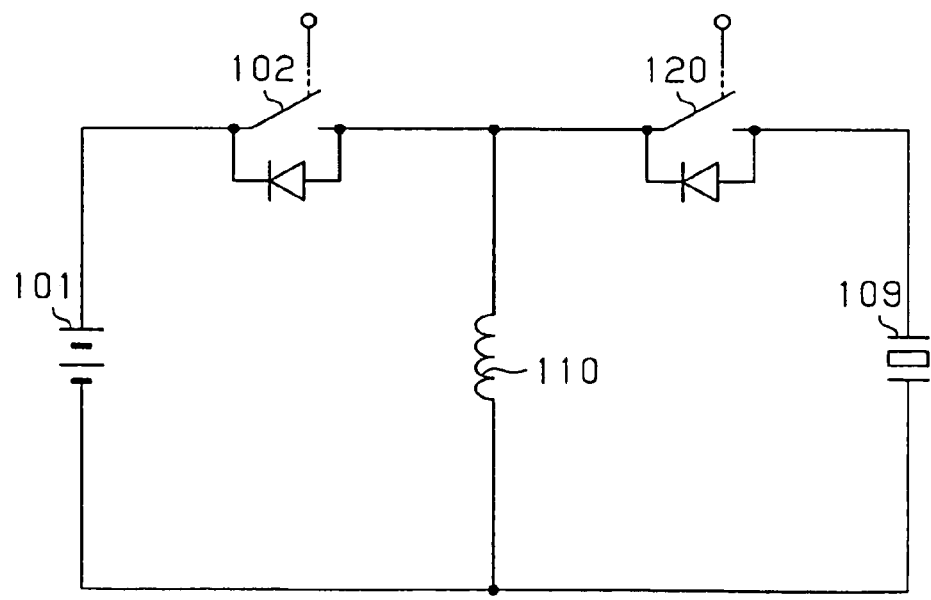
FIG. 26 is a circuit diagram showing a step up/down chopper circuit to describe a background art.

Furthermore, as shown in FIG. 19, respective one terminals of three capacitors (charge storage elements) 20a, 20b, 20c may be connected to a 3-phase load 22 such as a 3-phase rotating machine or the like. At this time, the output voltages of the respective capacitors (charge storage elements) 20a, 20b, 20c may be controlled so that sinusoidal wave voltages which are different in phase from one another by about 120 degrees are applied to interphase voltages ΔV1, ΔV2, ΔV3 of the 3-phase load. Furthermore, when the 3-phase load 22 is a rotating machine, in a 3-phase PWM control 2-level inverter shown in FIG. 21, application of a surge voltage to the motor terminal is more problematic as the voltage of the DC voltage source is increased. On the other hand, in the construction of FIG. 19 (this circuit system), since a voltage having a sinusoidal waveform is applied to the 3-phase load 22, various problems caused by the surge voltage can be solved.

When the 3-phase load 22 is a star-shaped wire connection, the minus terminal of the DC voltage source 1 and the neutral point of the 3-phase load 22 may be short-circuited to each other.

Figure 20:
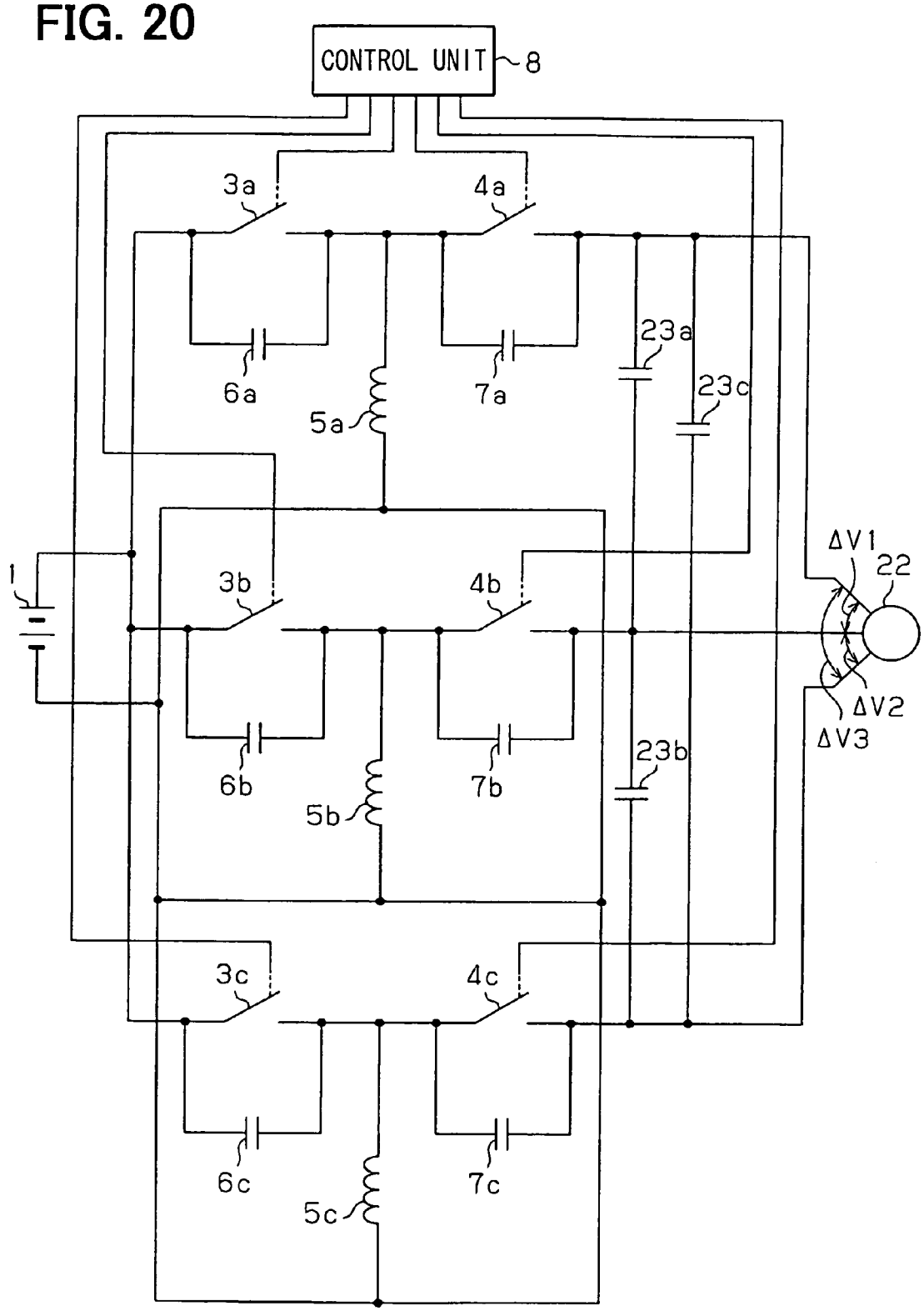
FIG. 20 is a circuit diagram showing the construction of a power control circuit for a charge storage element according to a modification.

Furthermore, as a modification of FIG. 19, the circuit construction of FIG. 19 may be designed so that a capacitor 23a is connected between the first terminal and the second terminal of the 3-phase load 22 (for applying ΔV1), a capacitor 23b is connected between the second terminal and the third terminal (for applying ΔV2) and a capacitor 23c is connected between the first terminal and the third terminal (for applying ΔV3). In the case of FIG. 20, when the 3-phase load 22 is a start-shaped wire connection, the minus terminal of the DC voltage source 1 and the neutral point of the 3-phase load 22 may be short-circuited.

The second embodiment described above has the following feature.

A plurality of unit circuits each of which comprises the first switch 3, the inductor 5, the second switch 4, and the capacitors (capacitance components) 6, 7 as the circuit constituent elements in FIG. 1, are formed, and a single or plural DC voltage sources 1 and a single or plural piezoelectric elements (charge storage elements) 2 are connected to each unit circuit. That is, the system is constructed by plural unit circuits, each unit circuit being achieved by excluding the DC voltage source 1 and the piezoelectric element (charge storage element) 2 from the circuit construction of the first embodiment of FIG. 1, and the power of the single or plural piezoelectric elements (charge storage elements) 2 is freely controlled by the single or plural DC voltage sources 1. Accordingly, the variation of the output style can be enhanced, and the output optimization and the increase of the voltage can be performed. Furthermore, by controlling the switching phase of the switches of the unit circuits so that the switching phase is different among the unit circuits, the reduction of the loss (and miniaturization, reduction in cost) can be performed by reduction of the input/output voltage variation and reduction of the voltage variation. Still furthermore, when the voltage of the single piezoelectric element (charge storage element) 2 is controlled by connecting the plural unit circuits in parallel, the conduction loss can be reduced and the current can be increased by the parallel connection.

Furthermore plural piezoelectric elements (charge storage elements) 2 exist, and the voltage between one terminal of any first charge storage element and one terminal of any second charge storage element is controlled. With this construction, the variation of the output style can be more enhanced and the voltage can be more increased as compared with the case where only one charge storage element is provided.

As described above, in the system using plural unit circuits, the plural unit circuits can be optimally collectively controlled.

In the foregoing description, only the powering operation is carried out, only the regenerating operation is carried out and both the powering operation and the regenerating operation are carried out. Furthermore, in the second embodiment, the powering operation may be carried out by one unit circuit while the regenerating operation is carried out by another unit circuit (for example, in FIG. 13, the powering is carried out by the unit circuit at the upper side, and the regeneration is carried out by the unit circuit at the lower side).

The present invention is not limited to the above-described embodiments, and various modifications may be made without departing from the spirit of the present invention.

What is claimed is:

1. A power control circuit for a charge storage element comprising:
   a first series circuit comprising a DC voltage source, a first switch, and an inductor that are connected to one another in series;
   a second series circuit comprising a second switch, a charge storage element, and the inductor that are connected to one another in series;
   a capacitance component connected to at least one of the first switch, the second switch and the inductor in parallel; and
   a control circuit for switching the first switch and the second switch on or off, wherein the control circuit repeats a first state where the second switch is turned off and the first switch is turned on to make current flow in a closed circuit comprising the DC voltage source, the first switch, and the inductor to thereby transfer power between the DC voltage source and the inductor, a second state where the first switch is turned off and the second switch is turned on to make current flow in a closed circuit comprising the second switch, the inductor, and the charge storage element to thereby transfer power between the inductor and the charge storage element while interposing between the first state and the second state a third state where both the first switch and the second switch are turned off, and under the third state where both the first switch and the second switch are turned off, the control circuit turns on either switch to be turned on when a voltage across that switch to be turned on is reduced by resonance of a resonance circuit comprising the capacitance component and the inductor after the third state is set by turning off the first and second switches.

2. The power control circuit for the charge storage element according to claim 1, wherein a state where the current flowing in the inductor is equal to zero exists, and the control circuit turns off the first switch or the second switch at the time when the inductor current is equal to zero.

3. The power control circuit for the charge storage element according to claim 1, wherein at least one of the first switch and the second switch is designed so that a diode is connected to a synchronous rectifying element in a reverse parallel connection style, and the control circuit turns off the synchronous rectifying element when current flows in the synchronous rectifying element.

4. The power control circuit for the charge storage element according to claim 1, wherein the control circuit controls the switching period between the first switch and the second switch to control the power of the charge storage element.

5. The power control circuit for the charge storage element according to claim 1, wherein the charge storage element is an element for supplying power to a load connected to the charge storage element.

6. The power control circuit for the charge storage element according to claim 1, wherein a plurality of unit circuits each of which comprises the first switch, the inductor, the second switch, and the capacitance component as circuit constituent elements are provided, and a single or plural DC voltage sources and a single or plural charge storage elements are connected to each unit circuit.

7. The power control circuit for the charge storage element according to claim 6, wherein the control circuit controls the phase in each unit circuit comprising the first switch, the inductor, the second switch, and the capacitance component as the circuit constituent elements in the switching operation of the first switch and the second switch so that the phase is different among the respective unit circuits.

8. The power control circuit for the charge storage element according to claim 6, wherein plural charge storage elements exist, and the control circuit controls the voltage between one terminal of any first charge storage element and one terminal of any second charge storage element.

9. The power control circuit for the charge storage element according to claim 6, wherein a single charge storage elements exists, the terminals of each of the charge storage elements are connected to different unit circuits and the control circuit controls the voltage between the terminals of the charge storage element.

10. The power control circuit for the charge storage element according to claim 6, wherein plural charge storage elements exist, a load is connected to one terminal of any first charge storage element and one terminal of any second charge storage element, and power is supplied to the load.

11. The power control circuit for the charge storage element according to claim 6, wherein a single charge storage element exists, the terminals of the charge storage element are connected to different unit circuits, a load is connected to the charge storage element, and power is supplied to the load.

12. The power control circuit for the charge storage element according to claim 1, wherein the charge storage element may be a capacitor, a battery, or a piezoelectric element.

* * * * *